United States Patent
Shutic et al.

(10) Patent No.: US 8,714,101 B2
(45) Date of Patent: *May 6, 2014

(54) POWDER COATING BOOTH

(71) Applicant: Nordson Corporation, Westlake, OH (US)

(72) Inventors: Jeffrey R. Shutic, Wakeman, OH (US); Joseph G. Schroeder, North Royalton, OH (US); Jeffrey E. Dailidas, Barrington, IL (US); Kenneth Kreeger, Avon Lake, OH (US)

(73) Assignee: Nordson Corporation, Westlake, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/658,350

(22) Filed: Oct. 23, 2012

(65) Prior Publication Data

US 2013/0061886 A1 Mar. 14, 2013

Related U.S. Application Data

(62) Division of application No. 12/688,201, filed on Jan. 15, 2010, now Pat. No. 8,312,835, which is a division of application No. 11/425,233, filed on Jun. 20, 2006, now Pat. No. 7,665,414.

(60) Provisional application No. 60/718,379, filed on Sep. 19, 2005.

(51) Int. Cl.
*B05B 15/12* (2006.01)
*B05C 19/00* (2006.01)

(52) U.S. Cl.
USPC ............. 118/309; 118/308; 118/326; 454/53; 56/DIG. 46

(58) Field of Classification Search
USPC ....... 118/308, 309, 326, 634, DIG. 7; 454/50, 454/53, 55; 427/180, 345; 55/DIG. 46
See application file for complete search history.

(56) References Cited

U.S. PATENT DOCUMENTS

| | | | |
|---|---|---|---|
| 3,942,420 A | 3/1976 | Marino | |
| 4,220,432 A | 9/1980 | Wiggins | |
| 4,704,985 A | 11/1987 | Rubinstein | |
| 6,187,098 B1 | 2/2001 | Kramer et al. | |
| 6,616,764 B2 | 9/2003 | Kramer et al. | |
| 7,665,414 B2 * | 2/2010 | Shutic et al. | 118/309 |

FOREIGN PATENT DOCUMENTS

| | | |
|---|---|---|
| EP | 0 789 628 | 1/1999 |
| JP | 10211456 | 8/1998 |

(Continued)

OTHER PUBLICATIONS

Office Action dated Apr. 15, 2013, for corresponding Japanese Patent Application No. 2008-531415.

(Continued)

*Primary Examiner* — Yewebdar Tadesse
(74) *Attorney, Agent, or Firm* — Calfee Halter & Griswold LLP

(57) ABSTRACT

A powder spray for lengthy parts includes a booth wall structure comprised primarily of doors. A moveable roof may be raised and lowered to clean powder overspray from the interior surfaces of the booth. A cleaning process may be performed with a sideways extraction mode and a downward extraction mode. The mode change occurs when a bulkhead that travels with the moveable roof blocks the inlet duct to the recovery system. The recovery system may be a cyclone system for example. The doors of the booth are hinged so that they can be positioned for spraying operations and cleaning operations. Live hinge designs are provided and hose stress relief designs are also provided. The roof may carry accumulators for pressurized air that feed cleaning nozzles as the roof descends. In addition, exhaust air may be used to assist cleaning the interior surfaces as the roof descends. All of the energy provided for cleaning and color change may be provided by accumulators.

26 Claims, 17 Drawing Sheets

(56) References Cited

FOREIGN PATENT DOCUMENTS

| | | |
|---|---|---|
| JP | 2000508583 | 7/2000 |
| WO | 96/12568 | 5/1996 |

OTHER PUBLICATIONS

Office Action dated Dec. 13, 2013, for corresponding Japanese Patent Application No. 2008-531415.

* cited by examiner

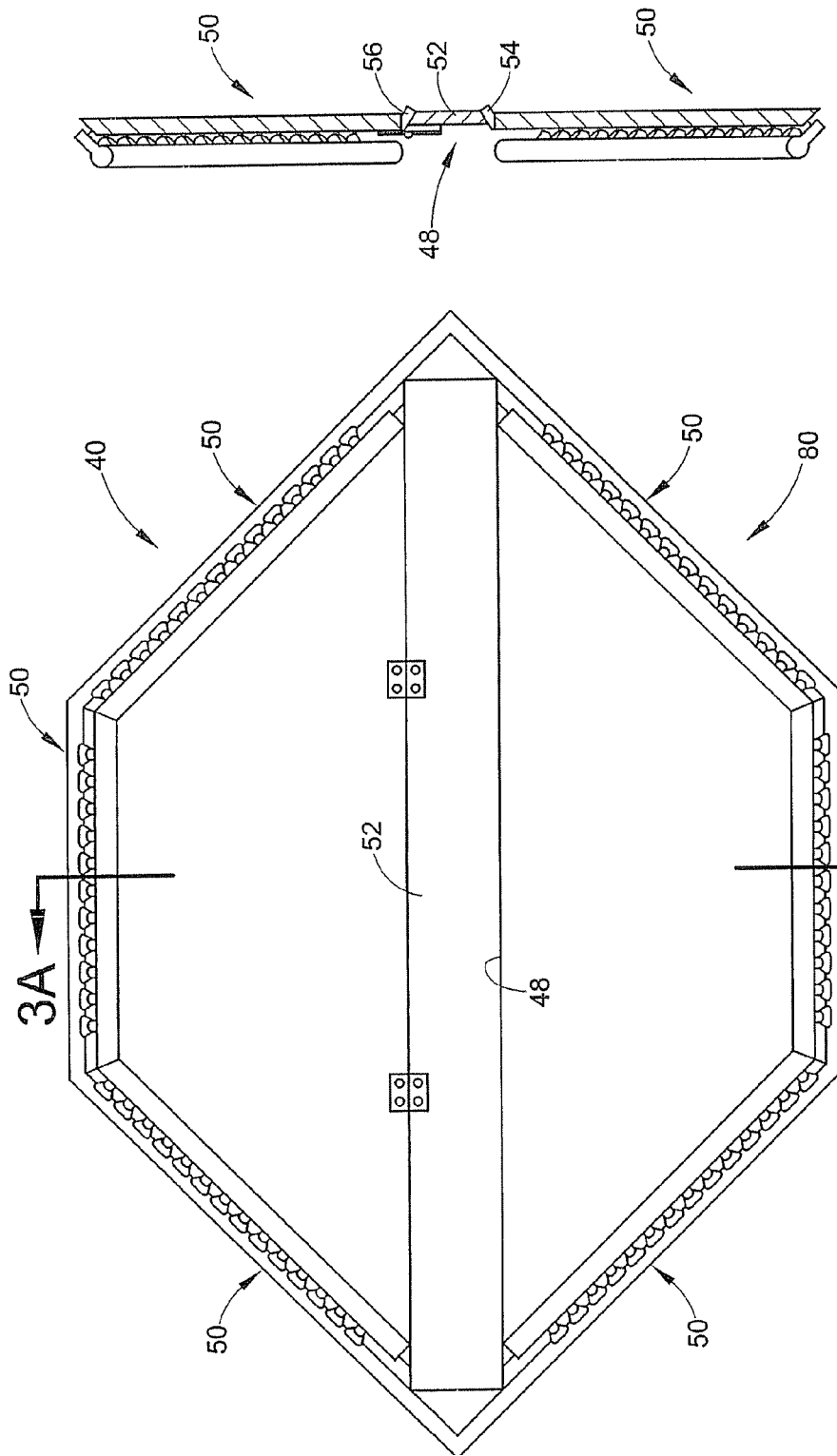

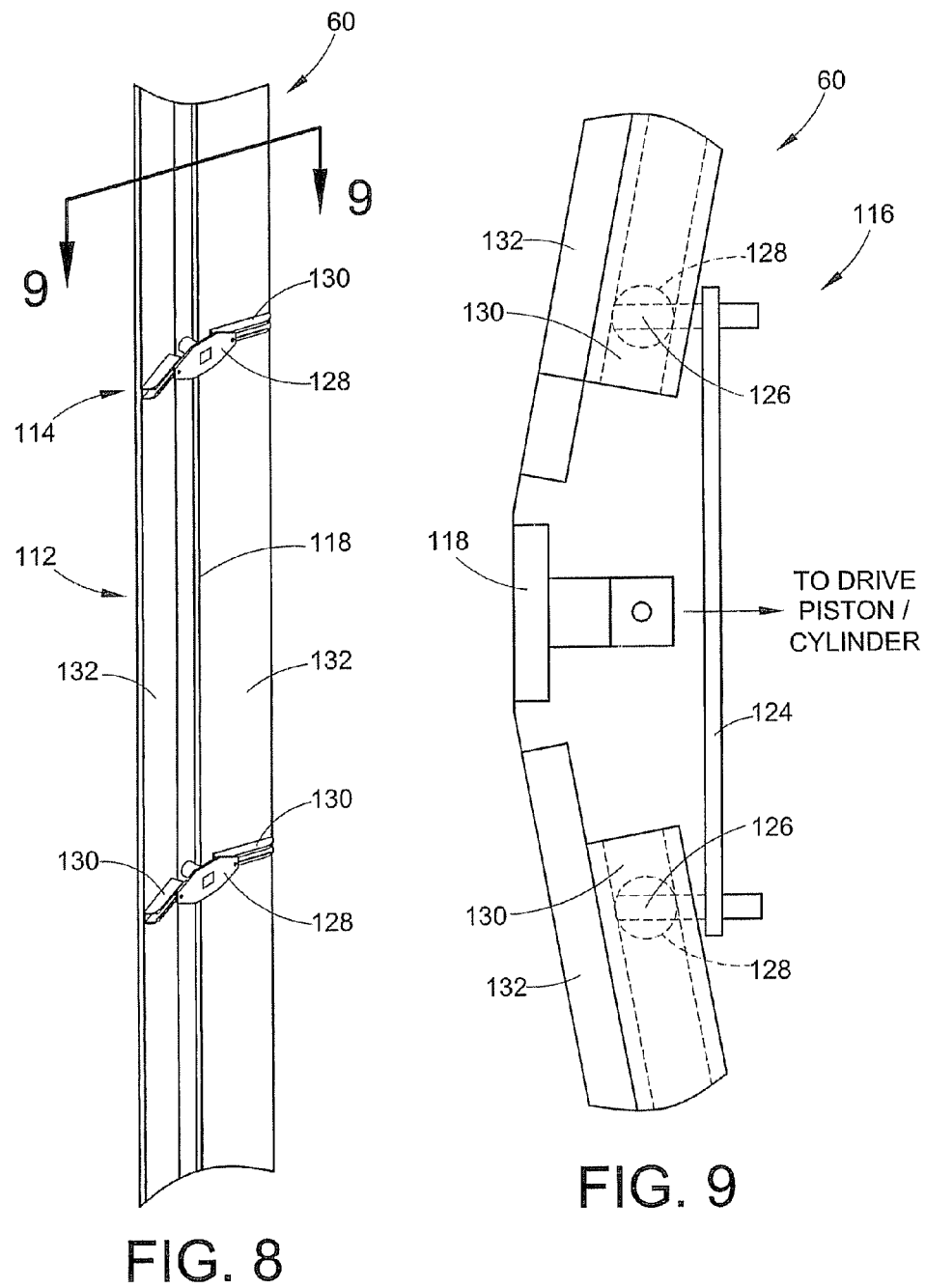

POWDER COATING BOOTH

RELATED APPLICATIONS

This application is a divisional of U.S. Non-Provisional patent application Ser. No. 12/688,201 filed on Jan. 15, 2010, for POWDER COATING BOOTH, which is a divisional of U.S. Non-Provisional patent application Ser. No. 11/425,233 filed on Jun. 20, 2006, for POWDER COATING BOOTH, which claims the benefit of U.S. Provisional Patent Application Ser. No. 60/718,379 filed on Sep. 19, 2005 for POWDER COATING BOOTH, the entire disclosures of which are fully incorporated herein by reference.

SUMMARY OF THE INVENTION

The invention relates generally to powder coating booths such as may be used with powder coating material application systems and processes. More particularly, the invention relates to powder coating material application systems, booths and processes for elongated objects, such as for example lengthy extrusions.

BACKGROUND OF THE INVENTION

Powder coating materials are typically applied to objects or work pieces by spray application apparatus and processes. These spray application apparatus and processes include electrostatic and non-electrostatic processes as are well known. Spray application of powder coating material often is done in a spray booth that is used to contain and recover powder overspray. Powder overspray may be recovered from the booth and either recycled back to the feed center for re-use or otherwise disposed of. One of the more significant aspects of any powder coating system is a powder change operation and the associated system down time and labor involved in such changeovers. For example, when the color of the applied powder needs to be changed, the entire system must be cleaned and purged of the just used color before the next color can be applied. This involves the clean and purge of spray guns, feed hoses and most importantly the spray booth. Long objects such as extrusions that can be up to about twenty-seven feet in length or more present unique challenges for powder application to those objects because a tall spray booth is required for adequate powder overspray containment.

SUMMARY OF THE INVENTION

In accordance with one aspect of the invention, a powder spray booth is contemplated that accommodates lengthy parts, objects or work pieces. In one embodiment, a spray booth is provided that has a plurality of doors with one or more of the doors being hinged for movement relative to the other doors, and further wherein the doors substantially comprise the booth wall structure. In a specific embodiment the booth includes four hinged doors and a vertical booth height of greater than twenty feet. In accordance with another aspect of the invention the booth is about three times greater in its vertical dimension than along its lengthwise dimension (wherein lengthwise dimension refers to an axis of travel of parts through the booth during a powder application process.)

In accordance with another aspect of the invention, a powder spray booth is contemplated that incorporates one or more gun slots that may be selectively opened and closed. In one embodiment, a gun slot cover is provided that may be moved between a gun slot open position that may be used during a powder application process, and a gun slot closed position that may be used during cleaning and powder change operations. In a specific embodiment the gun slot cover may be realized in the form of a pneumatically driven flexible member that bends to open the gun slot and relaxes to cover the gun slot.

In accordance with another aspect of the invention, a powder spray booth is contemplated in which the booth interior surfaces may be cleaned by pressurized air provided from a moveable structural member of the booth. In one embodiment, the spray booth includes a roof or ceiling structure that directs pressurized air against the booth interior surfaces as the roof is lowered from a first or raised position used during a powder application process and a second or lowered position used during cleaning and powder change. In a specific embodiment, the roof carries a plurality of pressurized air devices, such as for example nozzles that direct pressurized air at the booth interior surfaces. Air may be provided to such devices for example by one or more accumulators or air tanks carried on top of the moveable roof. In another embodiment that utilizes hinged doors as the booth wall structure, one or more of the doors may also carry pressurized air devices for removing powder off the booth floor.

In accordance with another aspect of the invention, a powder spray booth is contemplated that includes pressurized air devices for removing powder overspray off the booth interior surfaces. In one embodiment, the cleaning energy used to remove powder from the interior surfaces in the form of pressurized air is sourced from one or more accumulators. In a more specific embodiment, the pressurized air source is intermittently triggered so that blasts of air are directed at the interior surfaces of the spray booth. This produces pressure waves that dislodge powder overspray from the spray booth interior surfaces.

In accordance with another aspect of the invention, a powder spray booth is contemplated that is cleaned by a combination of pressurized air devices and flow of exhaust air into the booth such that the exhaust air assists in removing powder from interior surfaces of the spray booth. In one embodiment, a ceiling structure is provided that has a closely spaced relationship to the interior surfaces of the spray booth. A gap is provided between the ceiling structure and the interior surfaces so that exhaust air is pulled into the spray booth through the gap and applies a shearing force against powder particles on the interior surfaces to dislodge them. The ceiling structure may also carry pressurized air devices that direct high volume pressurized air in the form of pressure waves at the interior surfaces. In a specific embodiment, the ceiling structure may be raised and lowered within the spray booth. The invention further contemplates the cleaning method embodied in such apparatus, in particular a method for cleaning the interior surfaces of a spray booth including the steps of using exhaust air flow into the booth for part of the cleaning energy and intermittently applied pressure waves.

In accordance with another aspect of the invention, a hose strain relief mechanism is provided. The hose strain relief concept has application in any material application system that uses one or more flexible hoses. In the context of a spray booth for elongated parts such as described in the exemplary embodiments herein, the hose strain relief feature is useful due to very long and heavy hose runs particularly to the upper regions of the spray booth.

In accordance with another aspect of the invention, a cleaning arrangement and associated method for a powder spray booth is contemplated that operates in two modes, with one mode being a sideways recovery or extraction mode and the other being a downward recovery or extraction mode. In one embodiment, a spray booth is provided that includes a roof structure that can be raised and lowered within the booth interior, and the booth further includes a powder recovery system that interfaces with the booth interior through a vertical slot and through a floor duct. With the roof in an upper position, powder overspray is removed from the surfaces and drawn into the vertical slot into the powder recovery apparatus. In one embodiment the recovery apparatus may be a cyclone arrangement. As the roof is lowered, the powder extraction process switches over to powder overspray being extracted through the floor duct. In one embodiment this switch over may be realized by providing a traveling bulkhead within a vertical recovery duct that travels with the roof. When the roof reaches a predetermined position, the bulkhead blocks or isolates the recovery duct from the vertical slot and the floor duct is opened. In another embodiment, a floor slot is used adjacent to the recovery duct.

The invention further contemplates various methods embodied in the use of the described structures and or that can be carried out using such structures as set forth in detail hereinafter.

These and other aspects and advantages of the invention will be readily understood and appreciated from the following detailed description hereinafter and the accompanying drawings.

BRIEF DESCRIPTION OF THE DRAWINGS

FIG. 3 is a plan view of a ceiling structure or roof in accordance with the invention and FIG. 3A is a cross-section taken along the line 3A-3A of FIG. 3;

FIGS. 8 and 9 are a perspective and an enlarged plan illustrations respectively of the gun slot cover and drive mechanism of FIG. 7;

DETAILED DESCRIPTION OF THE EXEMPLARY EMBODIMENTS

Figure 1:
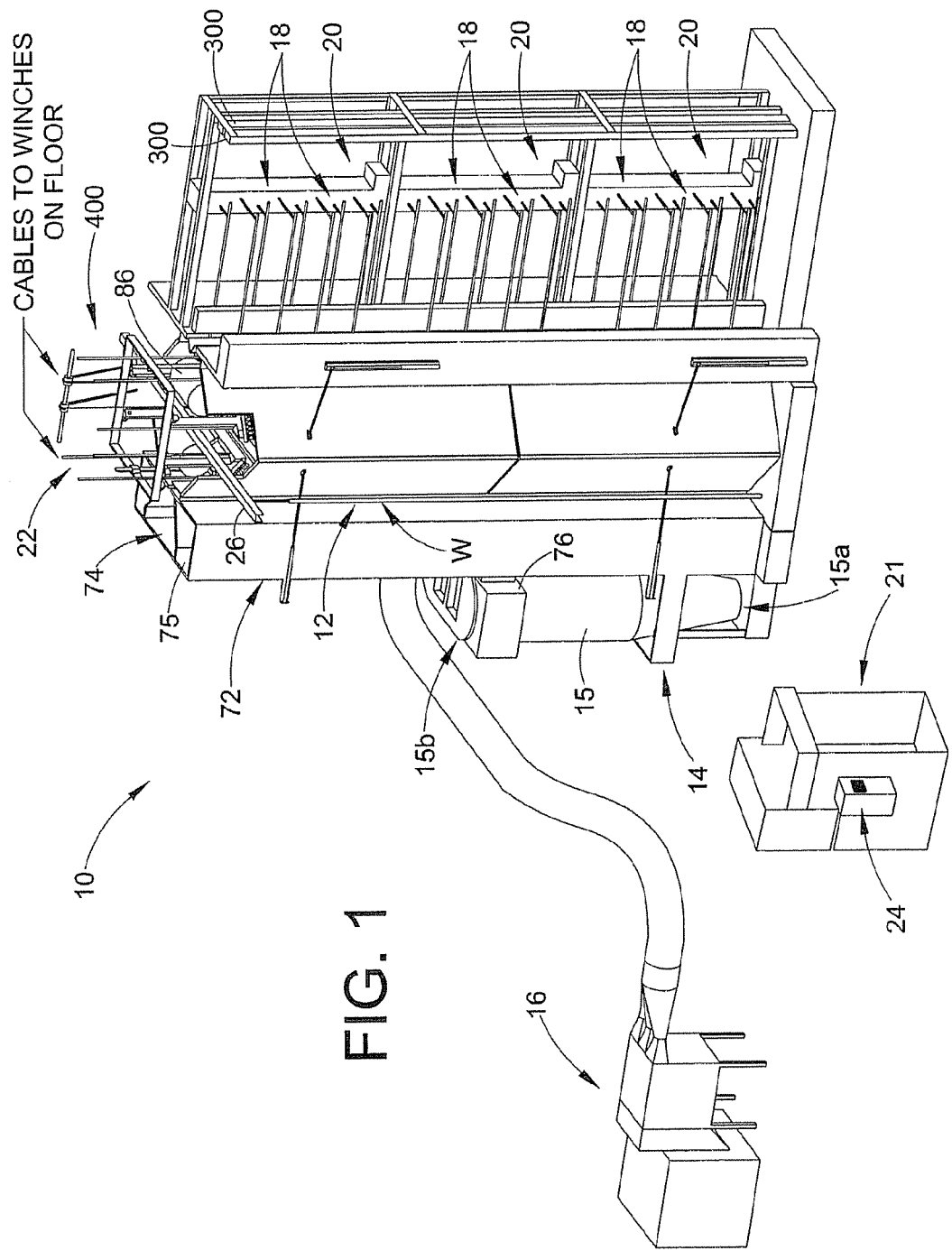
FIG. 1 is a perspective elevation of a powder spray system using several features of the present invention.

FIG. 1 illustrates a powder coating material application system 10 that includes a spray booth 12, a powder overspray recovery system 14, an after filter and blower system 16, a plurality of application devices 18, a gun mount and mover system 20 and an overall structural support framework 22 (only partially illustrated in the various drawings for clarity.) The application devices 18 may be selected from any number of spray gun designs, including a SURE-COAT™ spray gun available from Nordson Corporation, Westlake, Ohio. A feed center 21 may be provided that contains a supply of material that will be applied to objects or work pieces within the spray booth 12. The feed center 21 for example may include any number of hoppers, boxes or other containers of powder, along with suitable pumps and hoses to feed material to the application devices 18. A suitable operator interface 24 to a control system (not shown) may be provided to control operation of the spray guns 18, the powder recovery system 14, the spray booth 12 and the gun mover system 20. The control system and the operator interface 24 may be selected from any number of well known control system concepts as are well known to those skilled in the art, or specifically designed for a particular system. The gun mover system 20 may be used to both extend and retract the spray guns with respect to the spray booth 12 and also may be used to produce an up down oscillatory motion of the guns during a spray operation.

In the exemplary embodiment, the powder overspray recovery system 14 may be realized in the form of a cyclone system 15, however, other recovery system designs may be used. The blower and after filter system 16 provides the energy required for operation of the cyclone recovery system, in the form of a substantial powder entrained exhaust air flow pulled from the spray booth interior to an intake duct of the cyclone 15. The air flow produced by the recovery system also produces a substantial flow of air into and through the spray booth 12, sometimes referred to as containment air. The containment air flow prevents the loss of powder overspray outside the spray booth 12. In the embodiments herein, the cyclone system 15 is a twin cyclone system, however a single cyclone may alternatively be used. In the exemplary embodiment, powder may either be recovered from the cyclone outlet 15a, as is commonly done if the powder will be reused, or alternatively may be extracted from the booth 12 and pass through to the after filter system 16 via a bypass outlet or duct arrangement 15b.

Figure 2:
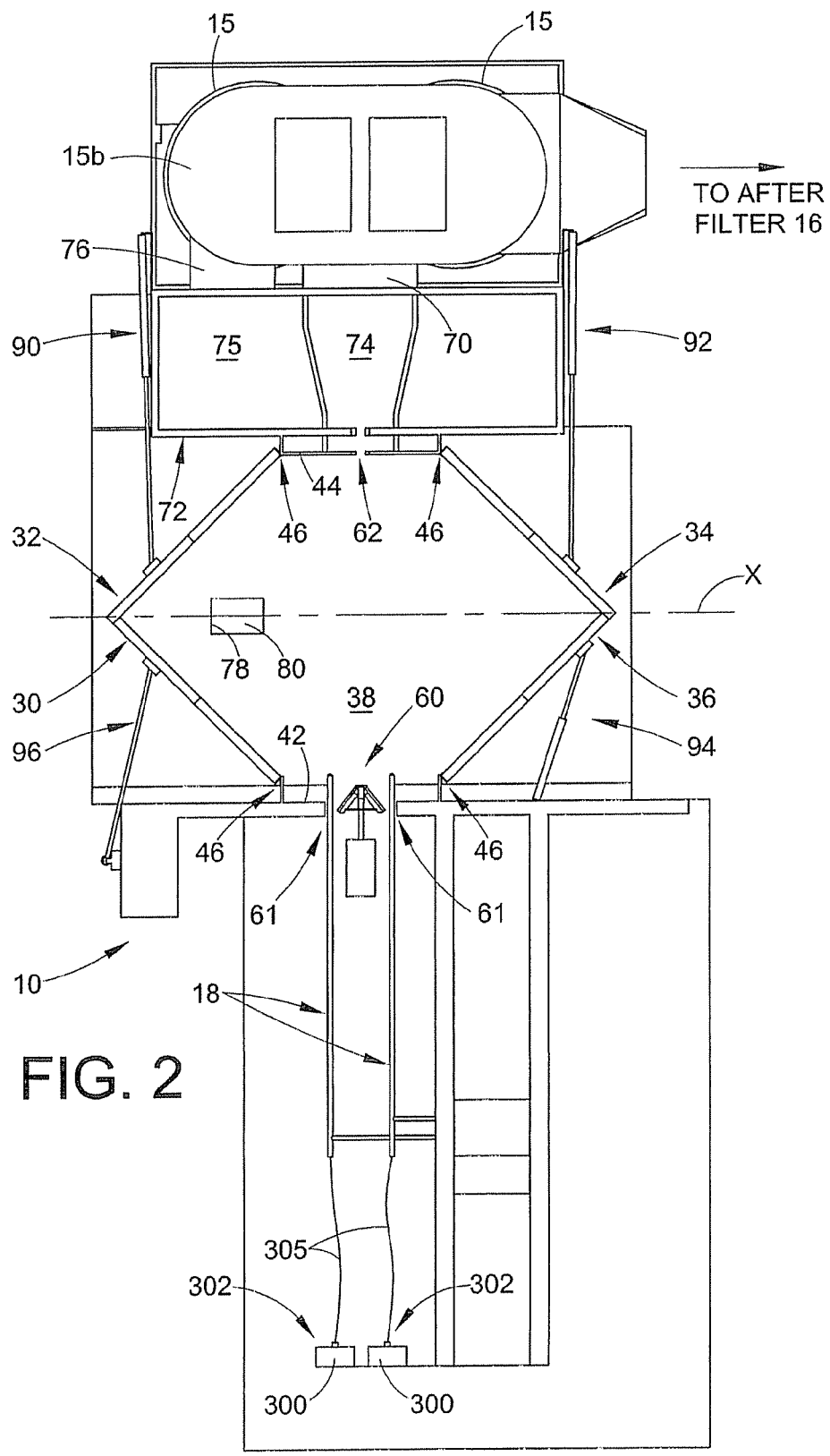
FIG. 2 is a plan view of the system of FIG. 1 with the overspray recovery system omitted for clarity.

The cyclone 15 has a cyclone inlet 70 (FIGS. 2 and 2A) that communicates with a first or recovery duct or plenum 74 of a vertical primary duct structure (72, see FIG. 2). The cyclone 15 also has a bypass duct inlet 76 that communicates with the bypass outlet duct 15b and also communicates with a second or bypass duct or plenum 75 that is provided in the primary duct 72. Alternatively the bypass duct 75 and the recovery duct 74 may be separate structures. The bypass arrangement may include a bypass door (see below) that opens and closes depending on where the extracted power is to go. As will be described in greater detail hereinafter, a bulkhead is provided within the recovery duct 74 that under certain conditions blocks the cyclone inlet 70 so that with the bypass door open the extracted powder goes to the after filter 16 via the bypass duct 75 and the bypass outlet 15b, thus bypassing the cyclone 15.

While various concepts, aspects and features of the invention are described and illustrated herein as embodied or used in combination in the exemplary embodiments, these various concepts, aspects and features may also be realized in many alternative embodiments, either individually or in various combinations and sub-combinations thereof. Unless expressly excluded herein all such alternative embodiments, combinations and sub-combinations are intended to be within the scope of the present invention. Still further, while various alternative embodiments as to the various aspects and features of the invention, such as alternative materials, structures, configurations, arrangements, methods, devices, software, hardware, control logic and so on may be described herein, such descriptions are not intended to be a complete or exhaustive list of available alternative embodiments, whether presently known or later developed. Those skilled in the art may readily adopt one or more of the aspects, concepts or features of the invention into additional embodiments within the scope of the present invention even if such embodiments are not expressly disclosed herein. Additionally, even though some features, concepts or aspects of the invention may be described herein as being a preferred arrangement or method, such description is not intended to suggest that such an arrangement or method is required or necessary unless expressly so stated. Still further, exemplary or representative values and ranges may be included to assist in understanding the present invention however, such values and ranges are not to be construed in a limiting sense and are intended to be critical values or ranges only if so expressly stated.

From the approximate scale of FIG. 1 it is noted that the spray booth 12 has a height or vertical dimension that is several times its length. In one example, the spray booth 12 is about twenty-seven feet high and about ten feet in length, wherein by 'length' is meant the distance that work pieces, parts and objects W travel through the spray booth 12 in order to be coated with powder. Thus, the present invention contemplates spray booths that have height to length ratios of at least about two to one and as much as about three to one or greater. This allows the spray booth to be used for powder coating long objects such as extrusions, however, the booth may also be used for spray coating any object that dimensionally can be accommodated through the booth. Due to the height of the booth 12, the structural framework 22 may include platforms (not shown) that can support workers who need to maintain the spray guns 18 and the gun support and mover system 20. An overhead conveyor 26 (partially shown) may be used to transport parts through the booth during a spraying operation.

While there are a number and variety of aspects and concepts to the present invention as set forth in greater detail herein below, two of these concepts should be particularly noted at the outset. The first concept relates to method and apparatus for cleaning the booth interior surfaces. The basic idea is to utilize not only the application of pressurized air to remove powder overspray, but also to utilize energy provided by the substantial air that is drawn into the spray booth by the recovery system. This air flow may be thought of as the containment air, exhaust air or a combination thereof. In accordance with the invention, during a cleaning operation this air flow is drawn through a somewhat narrow gap adjacent the interior surfaces to create a shear force of the air against the surfaces. This force not only removes powder overspray from the surfaces but also imparts significant kinetic energy and momentum to the dislodged particles which in turn may knock other powder particles from the interior surfaces. In conjunction with the use of the substantial air flow into the booth via the noted gap, pressurized air may also be intermittently applied against the interior surfaces in the form of pressure waves. This energy also removes powder overspray from the interior surfaces. In an exemplary embodiment described below, these two cleaning concepts of using exhaust air and pressure waves are used in combination and realized by using a moveable structure such as a roof that carries pressurized air nozzles and that provides the above noted gap adjacent the interior surfaces. The nozzles are intermittently triggered to create the pressure waves, and the source of the pressurized air in the exemplary embodiment may be one or more storage tanks or accumulators that store a volume of pressurized air.

The second concept to be noted is the idea of removing powder overspray from the booth interior initially by a sideways extraction into a vertical slot that extends along the height of the booth, wherein the slot opens to the intake of a recovery system such as a cyclone. A moveable roof may be used to further clean interior surfaces of the spray booth, and as the roof is lowered the powder overspray extraction transitions from a sideways extraction to a downward extraction through a duct or slot at the bottom of the booth. In the exemplary embodiment this transition occurs by blocking or closing the cyclone intake when the roof reaches a predetermined position, and opening a flow passage for powder overspray to be drawn from the booth into a bypass duct of the cyclone and on to the after filter system.

The spray booth 12 may be generally diamond shaped although two apexes of the diamond are somewhat truncated as will be apparent from FIG. 2 which is a plan view of the basic system 10 (the after filter and blower system 16 being omitted for clarity, as well as the roof and some of the frame work 22.)

With reference then to FIG. 2 and FIGS. 2A-2C, the exemplary spray booth 12 includes four doors 30, 32, 34 and 36 that may be hinged or otherwise mounted to the structural framework so as to be easily opened and closed. The spray booth 12 is substantially defined by these four doors, a floor 38 and a moveable roof or ceiling structure 40. The right front door 30 is hinged to one side of a gun slot panel 42 and the left front door 32 is hinged to one side of a recovery duct intake panel 44. The right rear door 36 is hinged to an opposite side of the gun slot panel 42 and the left rear door 34 is hinged to an opposite side of the recovery duct panel 44. The terms front and rear are used as a convenience to refer to the lengthwise ends of the booth that the traveling parts enter and leave respectively it being understood that direction of travel through the booth may be reversed. The terms left and right are also merely a convenience when referring to the drawings. Due to their length, the doors may be multi-piece construction having an upper section and a lower section as best illustrated in FIGS. 1 and 2A-2C. Thus, other than the short (lengthwise) gun slot panel 42 that truncates one apex of the diamond and the short (lengthwise) intake panel 44 that truncates an opposite apex of the diamond, the booth 12 has a vertical wall structure that is defined in large measure by four hinged doors with each door comprising two (upper and lower) sections. This is in distinct contrast to prior booths that typically have a door structure at the booth ends but otherwise have fixed vertical walls that define the booth configuration.

The hinged doors 30, 32, 34 and 36 may each be made of composite materials including a foam core panel and gelcoat inner surface such as sold by Nordson Corporation as an Apogee panel structure. Other door structures may alternatively be used as required. The doors may be removably mounted using lift off hinges 46 as will be further described herein, or other suitable hinge designs as required. The spray booth vertical wall structure is thus primarily defined by the doors.

Figure 2A:
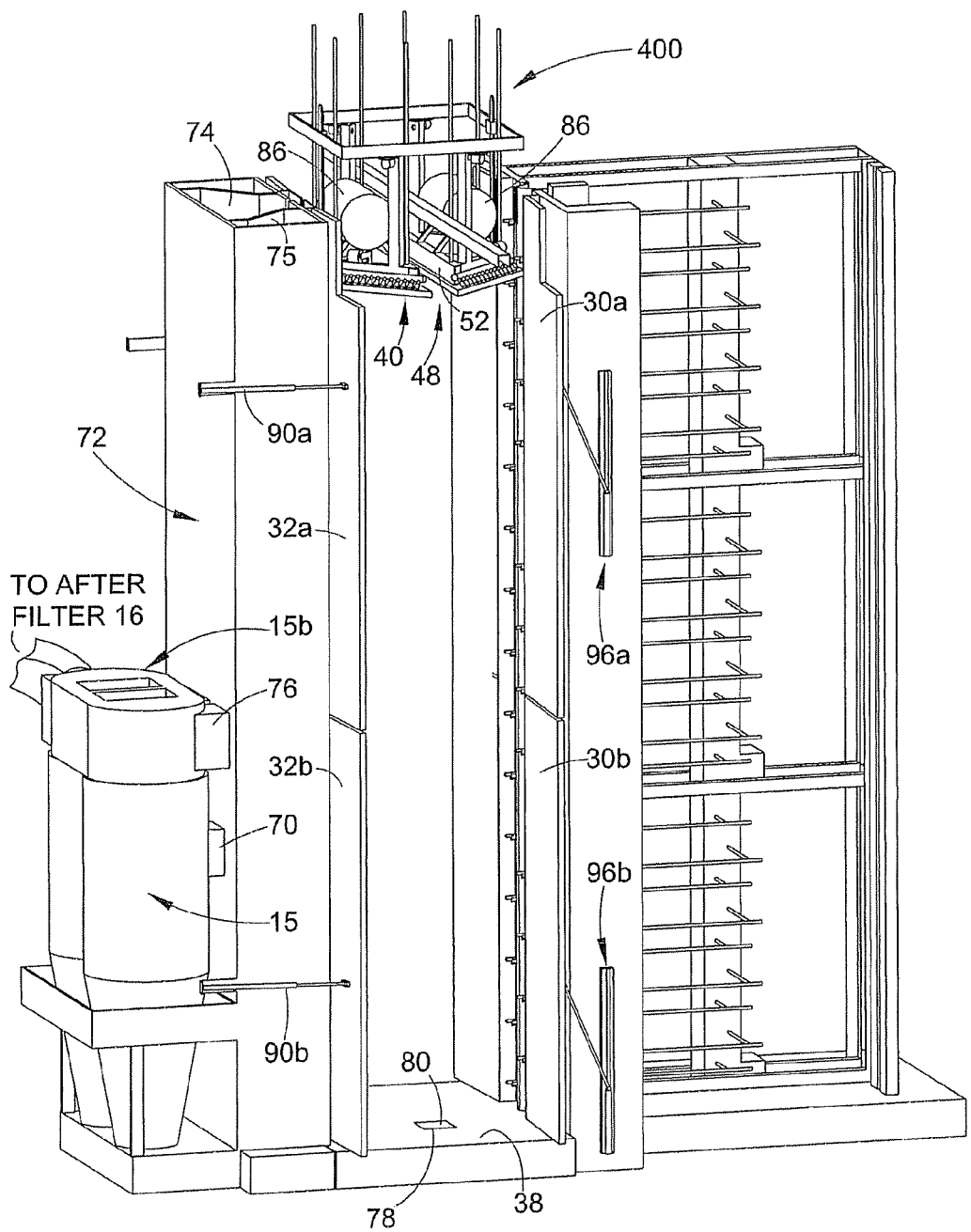
FIGS. 2A, 2B and 2C illustrate the spray booth of FIG. 1 in various exemplary but not exclusive door positions including a service position, a coating or operational position and a cleaning position respectively.
Figure 2B:
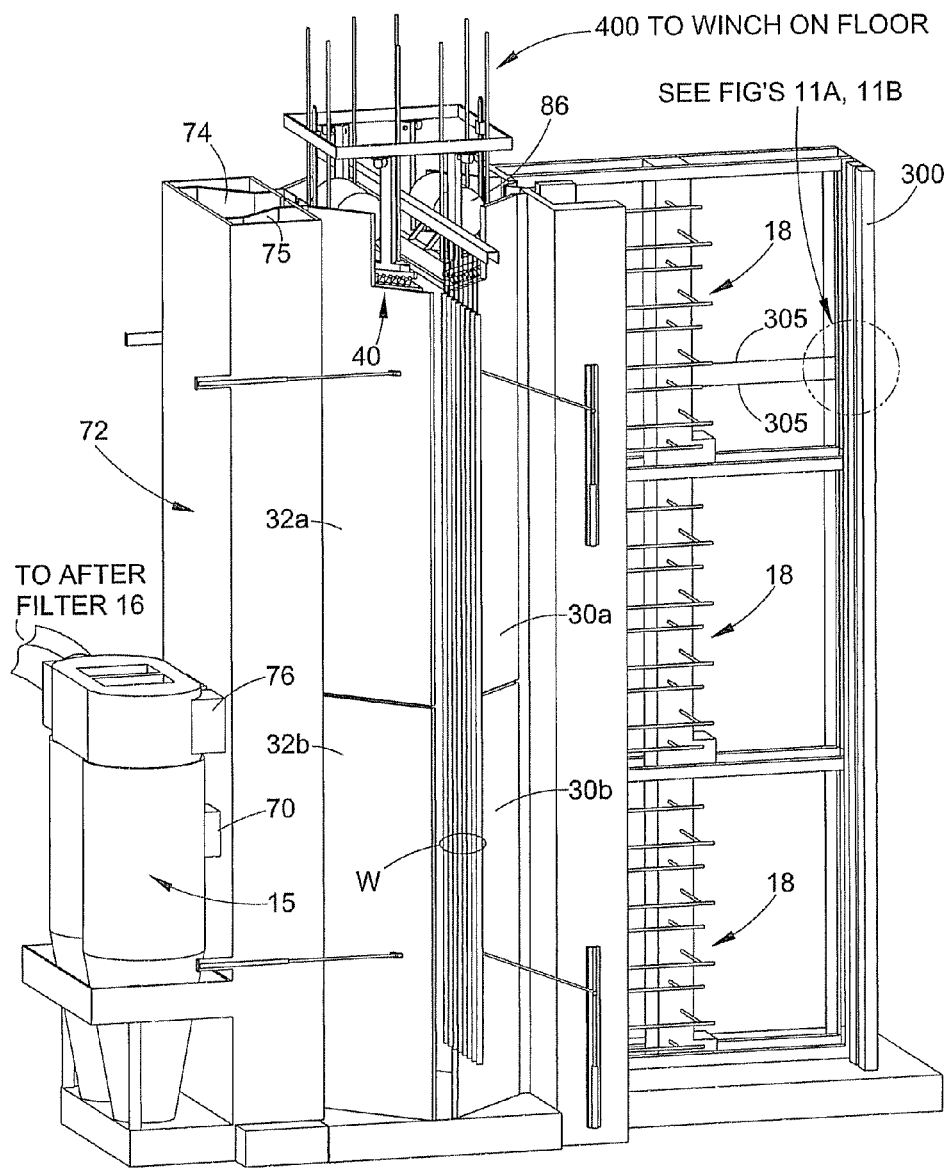
Figure 2C:
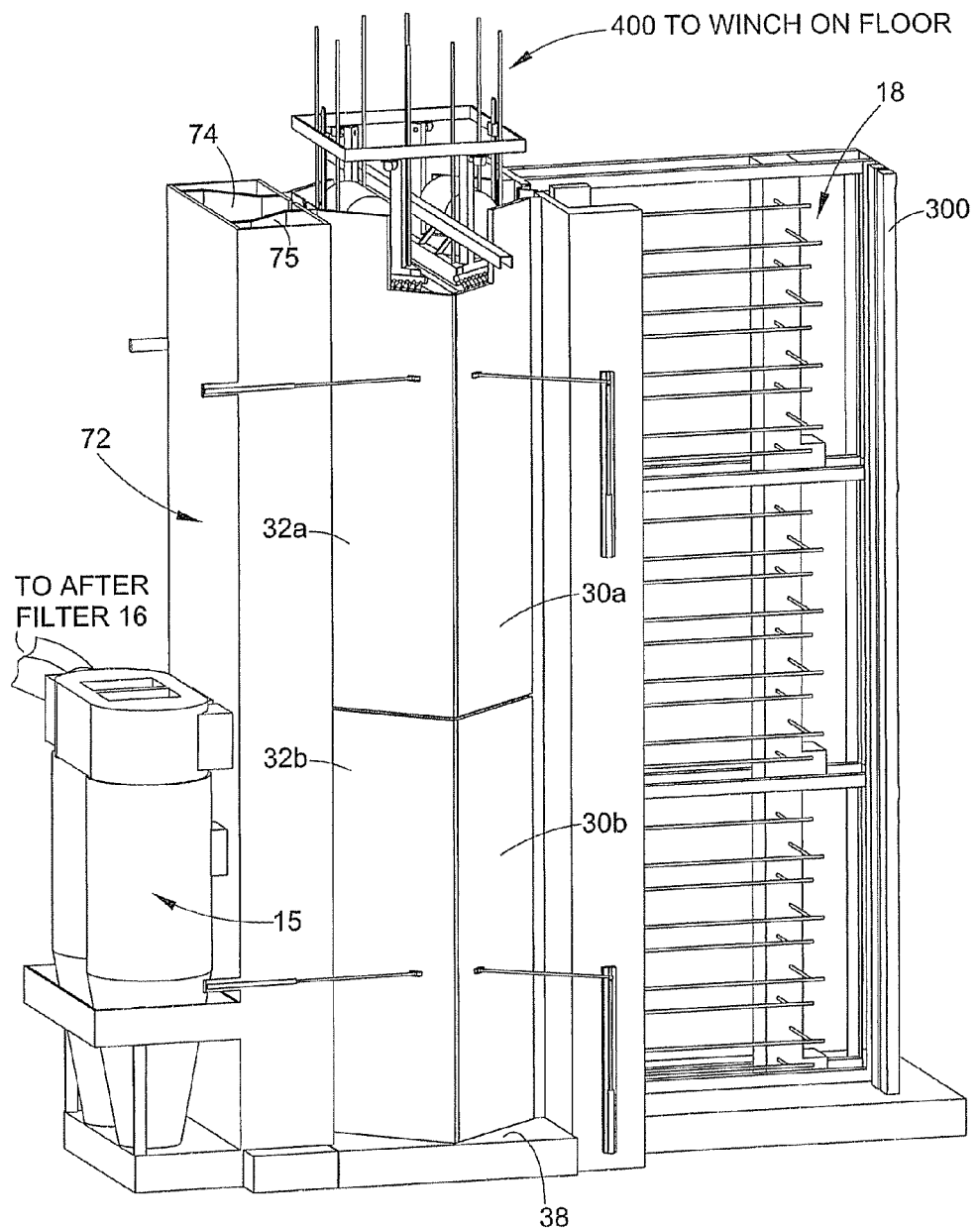
Figure 13:
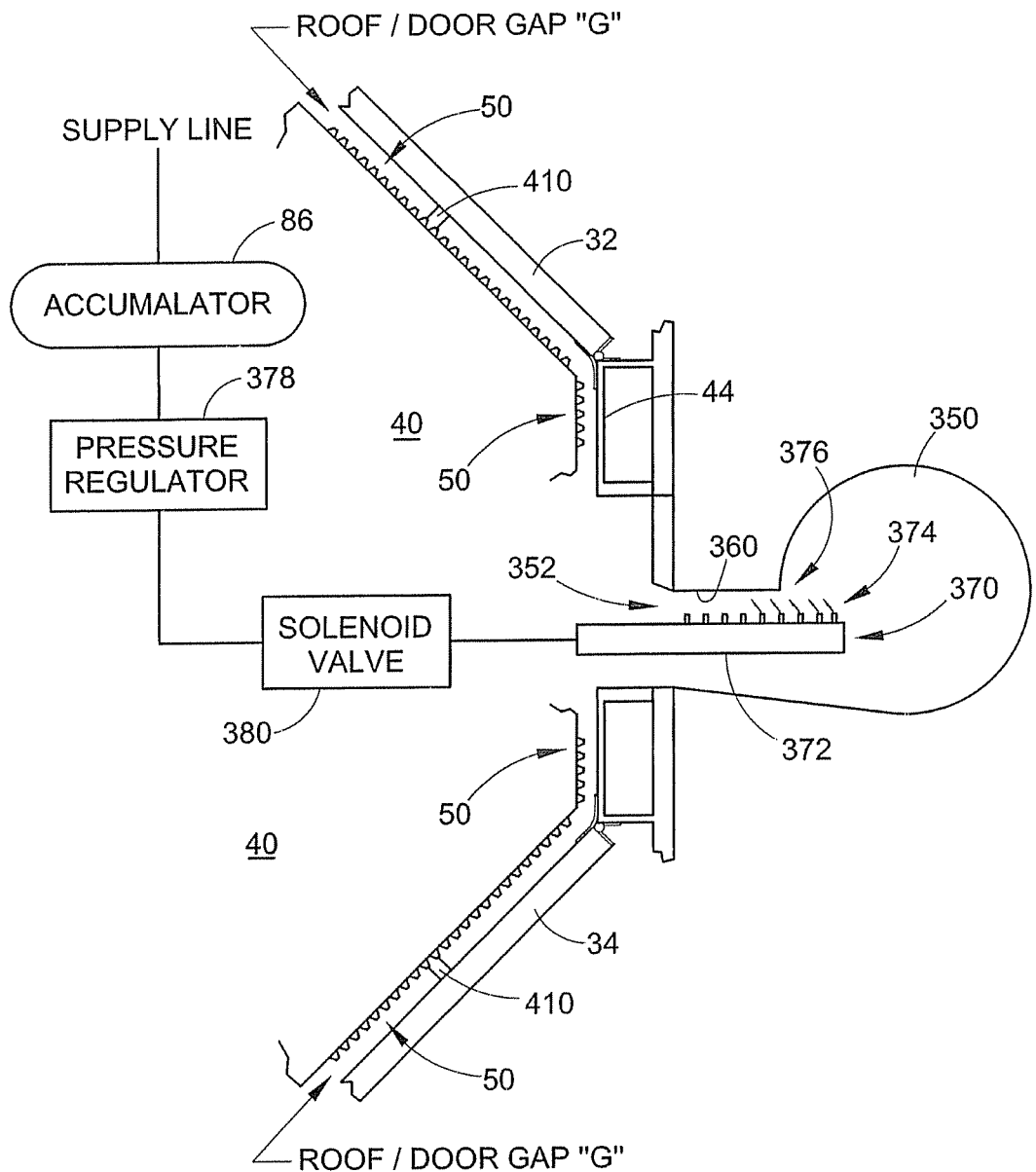
FIG. 13 is a simplified schematic of a duct blow off feature.

The roof 40 may also be made of composite panels and has a generally conforming diamond shape perimeter (generally conforming to the plan shape of the booth when the doors are closed) but with a conveyor slot 48 provided (FIG. 2A). The roof 40 includes an upper frame (404, FIGS. 14A, 14B) that is supported by a series of cables or other suitable mechanism so that the roof can be raised and lowered in a level manner within the spray booth. The roof 40 is in its uppermost position (FIG. 2A) during a material application or coating operation and can be lowered nearly to the floor (see FIG. 4A) during a cleaning or color change operation. The roof 40 is dimensioned so that the generally conforming perimeter has a narrow lateral clearance or gap with the door surfaces, for example about two inches, when the doors are fully closed (FIG. 13). This narrow clearance helps to contain powder overspray while at the same time providing a source of exhaust air drawn into and through the booth by the powder recovery system 14. This substantial air flow through the roof/door gaps is also used to clean the door interior surfaces as will be further explained.

FIG. 3 illustrates a plan view of the roof 40 panel structure. The roof 40 carries a series of air nozzles 50 that may extend around the entire periphery of the roof (in FIG. 3 not all of the nozzles are illustrated) or at least at enough intervals and positions to thoroughly clean the interior surfaces of the doors. The roof 40 also includes a conveyor slot cover 52 that preferably is hinged so that it can be raised and lowered either manually or by operation of a suitable actuator. The cover 52 is raised to its upright position for a spraying operation so that the conveyor hangers can pass through the slot 48. During cleaning and/or color change operations, however, the cover 52 is lowered to its closed position. FIG. 3A further illustrates that the roof may include two air ducts 54 and 56 that extend lengthwise along either side of the conveyor slot 48 and provide an air flow down into the booth so as to prevent powder from escaping through the conveyor slot 48. As explained below, the ducts 54, 56 may be coupled to a suitable source of pressurized air.

As noted herein above, the roof 40 may include a frame structure (404, see FIG. 14) that may be supported by winch driven cables 400 so that the roof 40 can be raised and lowered during a cleaning operation. Since the roof is basically a two section structure, the closed cover 52 helps to stabilize the roof sections as it travels up and down the booth, especially when the nozzles 50 are intermittently triggered. The roof frame 404 further supports a source or reservoir of compressed air such as air tanks (86, FIG. 14A) or accumulators that provide high volume pressurized air to the ducts 54, 56 and the nozzles 50. The tanks 86 thus provide an energy/volume storage system to deliver high volume pressurized air when the nozzles 50 are triggered, thus producing a pressure wave of high volume air directed at the interior surfaces of the booth 12. Supply hoses are connected to the tanks 86 to replenish them during a cleaning operation.

As best illustrated in FIGS. 2A-2C and FIGS. 4A-4B, the latter which are a simplified schematic of the cyclone/booth interface, the cyclone 15 interfaces with the spray booth 12 via the primary duct 72 that extends the height of the booth 12. The duct 72 is multi-sectional and includes an interior recovery plenum 74 that communicates with a booth intake slot 62 formed in the intake panel 44. The plenum 74 also communicates with the cyclone inlet 70. Powder overspray is drawn sideways into the plenum 74 from the spray booth 12 via the slot 62 and passes into the cyclone 15 via the cyclone intake duct 70. During spray coating operations, the roof 40 is positioned at the top of the booth 12. The intake slot 62 extends vertically along the entire height of the booth 12.

As will be further explained herein below, the floor 38 may include a bypass opening 78 that may be selectively opened and closed with a slide cover 80. During a cleaning operation, as the roof 40 is lowered towards the cyclone inlet region, powder overspray is removed from the interior surfaces of the booth 12 and drawn into the intake slot 62 and into the cyclone for recovery. As the roof 40 is lowered to a point at which the cyclone inlet 70 is blocked by a bulkhead 82 (see FIG. 4A), the bypass opening 78 is opened and communicates with the vertical bypass duct 75 which connects to the bypass inlet 76 above the cyclone 15 (see FIG. 4a) so that the powder entrained exhaust air bypasses the cyclone and is transported to the after filter and blower system 16. The bulkhead 82 travels vertically within the recovery duct 74 at the same speed as the roof 40 during a cleaning operation. But, when the bulkhead 82 reaches a position in which it faces and blocks off the inlet to the cyclone 15, positive stops prevent the bulkhead 82 from being lowered further even though the roof 40 continues to descend during a cleaning operation. When the cyclone inlet is blocked by the bulkhead 82, the bypass opening 78 is opened and powder flows through the opening 80 and into the bypass recovery duct 75 and on to the after filter and blower system 16 via the cyclone bypass duct 15b.

The doors 30 and 36 that generally extend away from the gun slot panel 42 and toward the recovery intake slot 62 may be provided with air jets (not shown) along their bottom edge so as to direct powder that falls on the floor toward the intake slot 62 of the recovery system. Compressed air tanks or accumulators (not shown) may be disposed below the floor of the booth or other convenient location to supply high volume compressed air to the door air jets. In accordance with an aspect of the invention, all of the energy needed to remove overspray coating material—from the booth interior surfaces via nozzles on the roof, the doors, gun blow off nozzles and so on—may be provided by accumulators so that the energy in the form of high volume pressurized air can be stored and ready to use. The accumulators may be replenished during spray coating operations although the accumulators 86 on the roof 40 are periodically replenished during a cleaning operation as will be further explained below.

The doors 30, 32, 34 and 36 are fully closed as in FIG. 2 during a cleaning mode of operation. When the doors are fully closed, the doors closely surround the roof 40 perimeter (for example with about a lateral two inch gap), and the roof conveyor slot cover 52 is closed so that powder overspray can be removed from the interior surfaces of the booth and will be contained and not escape the booth but rather collected into the recovery system. A gun slot cover arrangement 60 (FIG. 2 and the discussion below referencing FIGS. 7-9) is also closed to prevent powder escaping through the gun slots 61. Prior to and/or after the conveyor slot cover 52 is closed, the roof nozzles 50 may be triggered to remove powder at the top of the booth surfaces.

The roof 40 is lowered and the air nozzles 50 that travel with the roof are used to remove powder off the interior surfaces of the doors. In this exemplary embodiment, the nozzles 50 are intermittently triggered to direct pressure waves along the booth surfaces, for example about a 1.5 second blast of air at about 100 psi. The accumulators 86 are sized to permit them to be mounted on the roof frame and travel with the roof 40, therefore, the accumulators 86 are not particularly large. For example, the accumulators 86 may be sized at about sixty gallons so that each discharge cycle through the nozzles 50 substantially reduces the stored amount of compressed air energy in the accumulators 86. In the exemplary embodiment, it takes about eight seconds to replenish the accumulators 86 so that the nozzles 50 are intermittently triggered or cycled at about 1.5 second on and about eight seconds off as the roof is lowered. The descent rate of the roof is balanced with the replenish rate of the accumulators so that there is no loss of pressure or volume to maintain effective cleaning of the surfaces throughout the descent of the roof 40.

Figure 4A:
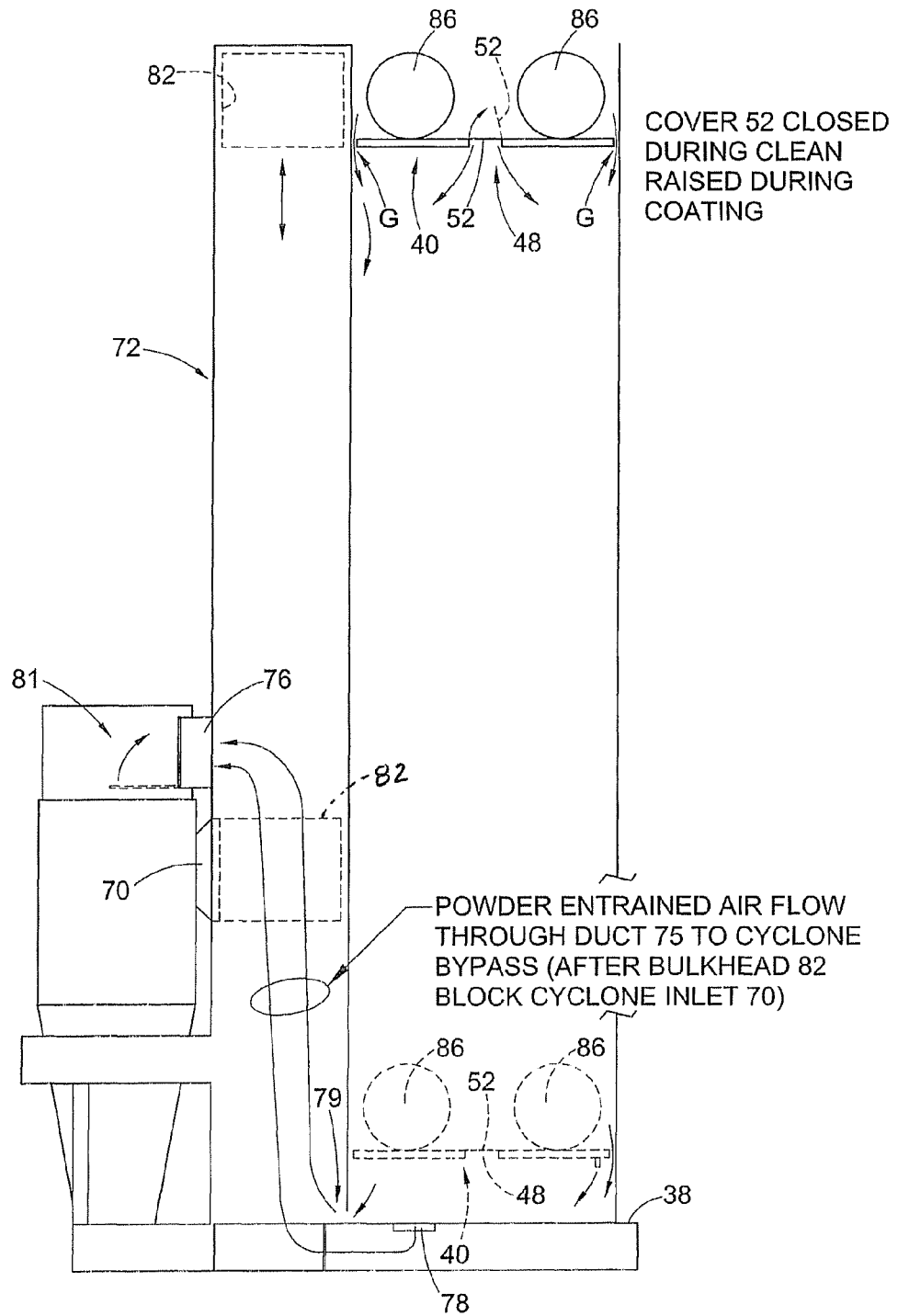
FIGS. 4A and 4B are simplified illustrations of the powder recovery ducts and slots of a booth in accordance with the invention taken in elevation and perspective respectively.

During a cleaning as well as a coating operation, the after filter system 16 is constantly drawing exhaust air into the booth 12 via the cyclone 15. During a cleaning operation, this exhaust air primarily enters the booth 12 via the gap between the roof 40 perimeter and the door interior 30, 32, 34, 36 surfaces throughout the descent of the roof. With reference to FIG. 4A, this high velocity air flow produces a shearing force that dislodges powder particles from the door interior surfaces. This shear force is the only cleaning force applied to the interior surfaces during each eight second interval that the accumulators 86 are being replenished. The nozzles 50 create a pressure wave that is effective for a distance of about two feet with each 1.5 second trigger of high pressure air. Therefore, the rate of descent of the roof 40 during a cleaning operation may be selected to balance the effective use of the nozzles 50 to blast powder from the surfaces and the high velocity exhaust air to also dislodge powder from these surfaces. In one embodiment the roof may descend at about 8-10 feet/minute, and the roof retracted back to the top at about 30 feet/minute.

The size of the gap between the roof and the interior door surfaces may be used to control the air flow and shear force created by the exhaust air. The after filter system 16 can draw a substantial volume of exhaust air, so the gap cannot be made so small that the head pressure on the roof creates too much strain or stress on the roof assembly. A typical gap range may be about 1.5 inches to about 2 inches. The actual gap used will be determined by the booth size, the exhaust air flow characteristics, required cleaning time, the effectiveness of the pressure wave created periodically by the nozzles 50 and the desired rate of descent.

The use of the exhaust air to perform a significant portion of the cleaning operation has a significant cost benefit as it allows the amount of required pressurized air to be reduced. In one embodiment, the shear forces applied by the exhaust air passing through the gap between the roof and the doors provides about half of the energy needed to clean the booth 12 interior surfaces. This represents a substantial savings of pressurized air that would otherwise have to be used (or other cleaning techniques such as wiping actions).

The brief but high velocity pressure wave that is periodically applied via the nozzles 50 not only dislodges the powder particles from the surfaces being cleaned, but also imparts sufficient energy to the dislodged particles that they impact other particles to dislodge them. In the exemplary embodiment herein, the pressure waves have about a two foot effective zone so that the nozzles 50 may be intermittently triggered and need not produce a constant flow of pressurized air. The pressure waves do not cause static charging or impact fusion.

The powder entrained exhaust air is drawn into the recovery system 14, such as the cyclone intake duct 70, for example, via the intake slot 62 which extends vertically from the floor to the top of the booth. Since in this example the cyclone intake duct 70 is positioned about halfway between the floor 38 and the top of the booth, the intake slot 62 may vary in width along its length, being narrower near the cyclone intake duct 70 and wider at the top and bottom (see FIGS. 4A, 4B and 4C). This achieves a fairly uniform flow of air into the intake slot 62 along the entire height of the booth. For example, the intake slot 62 may be about two inches at the intake duct and taper in width to about four inches near the top and bottom of the intake panel 44.

During a cleaning operation, which may be part of a color change operation for example, the doors are fully closed, the guns are retracted from the booth (powder is removed from the gun exterior surfaces by air nozzles positioned at the gun slots) and the gun slot cover mechanism 60 is used to close the gun slots (as will be described hereinafter.) The conveyor slot cover 52 is also closed after all conveyor hooks have cleared the slot. The roof 40 is then lowered and powder is removed and directed downward off the surfaces of the doors and is drawn sideways into the intake slot 62 and the cyclone 15. Prior to lowering the roof, the nozzles 50 may be triggered.

As the roof 40 is lowered, the effective size of the booth changes. This changes the dynamics of the air flow into the cyclone 15. In order to efficiently continue to draw powder out of the booth interior, the operation is changed from a sideways recovery mode via the intake slot 62 to a downward or down draft recovery mode via the floor duct 78 (see FIGS. 4A and 4B). This changeover is accomplished by providing a recovery duct bulkhead 82 that travels within the plenum 74. The bulkhead 82 travels at about the same rate as the roof 40 while the roof is being lowered. The bulkhead 82 in one embodiment is a closed box-like structure or frame that generally conforms to the interior shape of the recovery duct plenum 74. Any suitable means may be used to move the bulkhead such as cables for example. As the bulkhead 82 reaches the intake inlet duct 70 of the cyclone 15, it blocks the inlet to the cyclone 15. Mechanical stops 84 may be provided inside the plenum 74 to limit further lowering of the bulkhead 82 within the plenum 74. When the inlet 70 to the cyclone is thus blocked, the floor bypass duct 78 is opened by sliding the cover 80. This allows powder that is directed down towards the floor 38 to be exhausted from the booth through the floor, into the bypass duct 75 and into the bypass inlet duct 76 of the cyclone (sometimes referred to as a banjo) to the after filter and blower system 16. After the roof has been lowered to or near the floor, it is then raised back up to the top of the booth and the bulkhead 82 also returns to the top of the plenum 74.

Figures 4B, 4C:
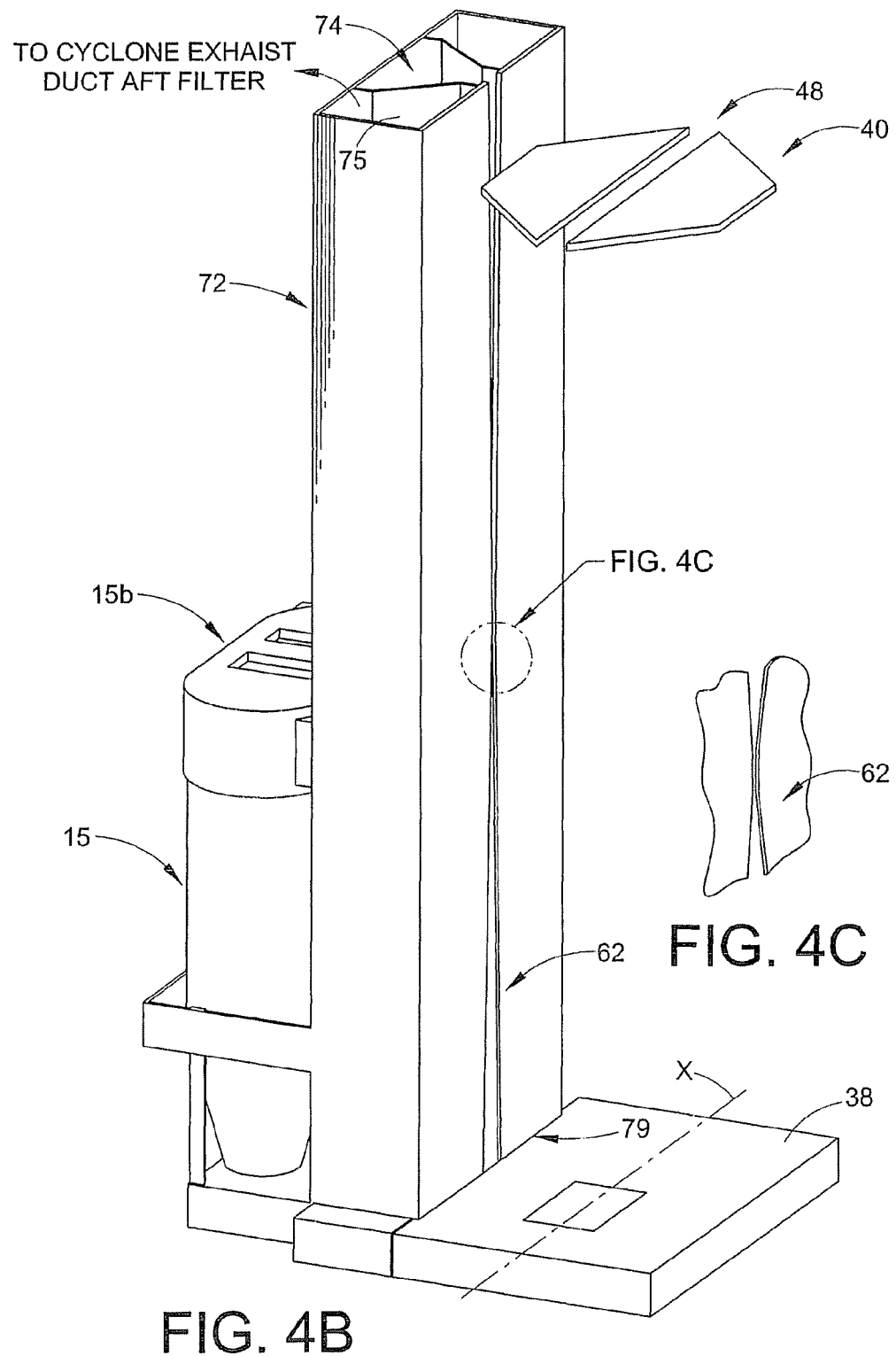
FIG. 4C is an enlarged view of the intake slot portion that is circled in FIG. 4B.

In an alternative embodiment illustrated in FIGS. 4A and 4B, in place of the floor opening 78, or in combination therewith, a slot 79 may be provided between the bottom of the primary duct 72 and the floor 38. This slot 79 communicates with the recovery duct plenum 74 so that downward moving exhaust air and powder enters the plenum 74 via the slot 79. Since the slot 79 will always be open, the exhaust air with powder may also be selectively recovered through the bypass duct 75 into the bypass inlet 76 of the cyclone 15. For example, when the roof 40 and bulkhead 82 are still in the upper portion of the booth 12, the slot 79 will communicate with the cyclone inlet 70 via the recovery duct 74. However, when the inlet 70 is blocked, the bypass duct door 81 may be opened so that the powder entrained exhaust air flows into the bypass duct 75, into the bypass outlet 15*b* and on to the after filter system 16. The door 81 may be realized in any convenient manner such as a simple plate valve the closes and opens the bypass outlet. A pneumatic cylinder or other motive means, including manual operation, may be used to open and close the cyclone bypass.

The roof 40 may carry with it one or more accumulators 86 that contain pressurized air and provide the energy and air needed for the air nozzles 50 that are mounted on the roof as well as the conveyor slot air plenums 54, 56. Separate accumulators may also be used to provide the pressurized air for the air jets mounted on the bottom edges of the doors as well as the blow off nozzles for the spray guns 18. In this manner all energy needed to clean the booth interior surfaces is provided from accumulators so that shop air need not always be applied to the cleaning apparatuses. The accumulators can be replenished during a coating or cleaning operation. This allows the cleaning energy to be maintained at a constant pressure as it is being discharged through the various cleaning nozzles including but not limited to the nozzles 50 on the roof 40. The various cleaning nozzles for the guns, the floor and the roof nozzles may be intermittently triggered at appropriate intervals such as every second and a half for example as described above.

Figure 5:
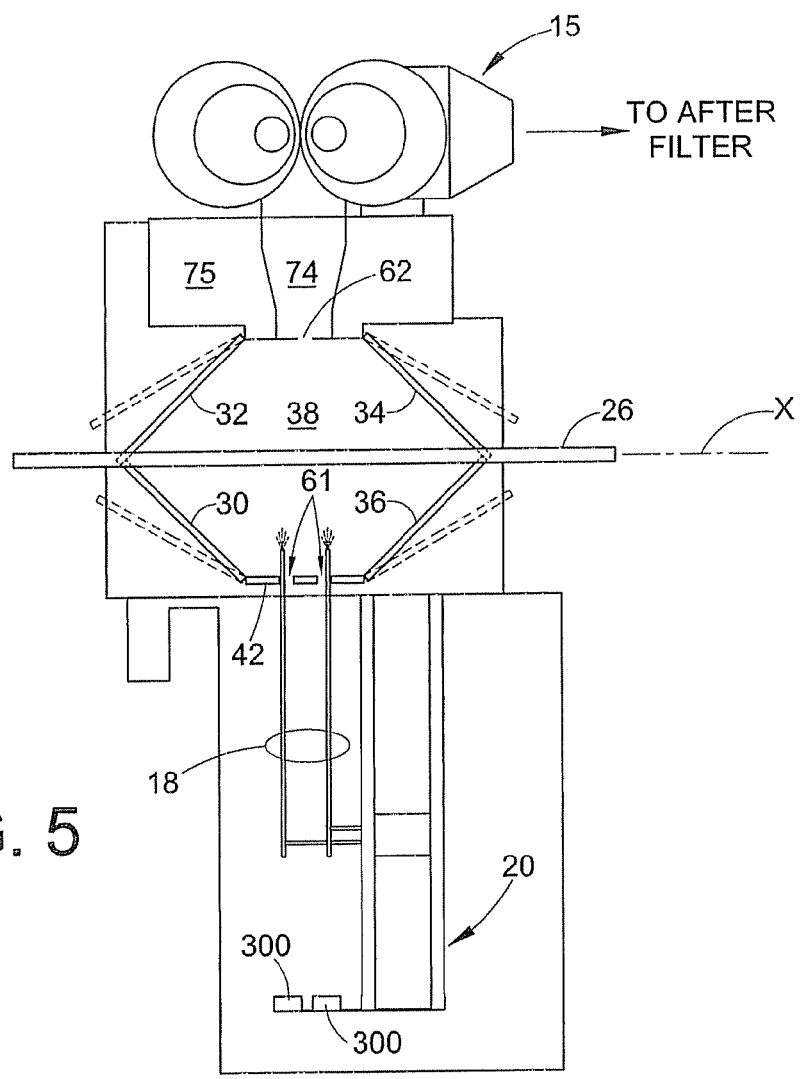
FIG. 5 is a plan illustration of the spray booth of FIG. 1 showing the doors in an open and closed position.

FIG. 5 illustrates schematically the door positions for cleaning and spraying operations (the doors in the closed position for cleaning are shown in solid line). During cleaning the doors are fully closed. During spraying, the doors may be opened to any convenient dimension to maintain adequate flow of containment air to contain the powder overspray. In one embodiment the doors are opened to an eighteen inch gap. The doors may be opened and closed with any suitable actuator mechanism. In the embodiment of FIG. 2, pneumatic cylinders 90 and 92 are used to open and close the left side doors and pneumatic cylinder driven arms 94, 96 are used to open and close the right side doors. Proximity sensors (not shown) or other suitable position monitors may be used to control positioning of the doors. For larger booths in which the doors include two or more sections, each section may have its own pneumatic drive member as illustrated in FIG. 2A. A door for example having an upper section 32a and a lower section 32b will have two actuators 90a and 90b that can be operated together to move the two sections as a single door unit. Similarly, the front right side doors 30a and 30b may be moved by actuators 96a and 96b.

Figure 6:
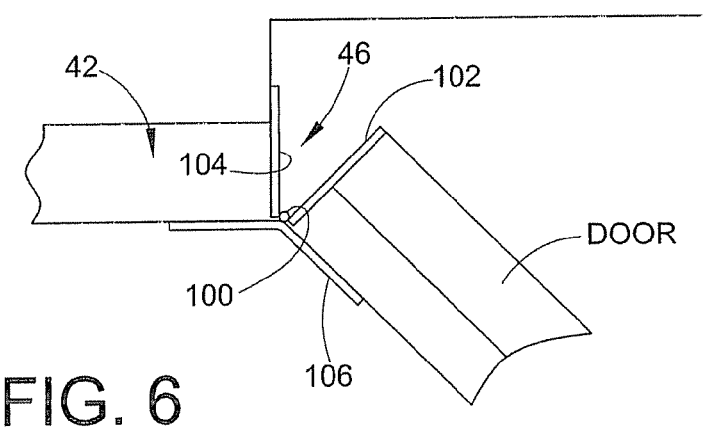
FIG. 6 is a detailed illustration of a live seal for a door of the spray booth of FIG. 1.

FIG. 6 illustrates an example of a lift off hinge 46 that may be used to mount the doors but other hinge designs may be used as required. In this example, the hinge 46 is realized in the form of a structural steel lift off hinge that includes a pivot pin 100. One plate 102 of the hinge is mounted to a door while the other hinge plate 104 is mounted on a suitable support structure. A piece of polypropylene 106 or other suitable material may also be installed on the inside surface of the hinge joint 46 that faces the booth interior to function as a live gap seal and prevent powder from escaping the booth.

Figure 7:
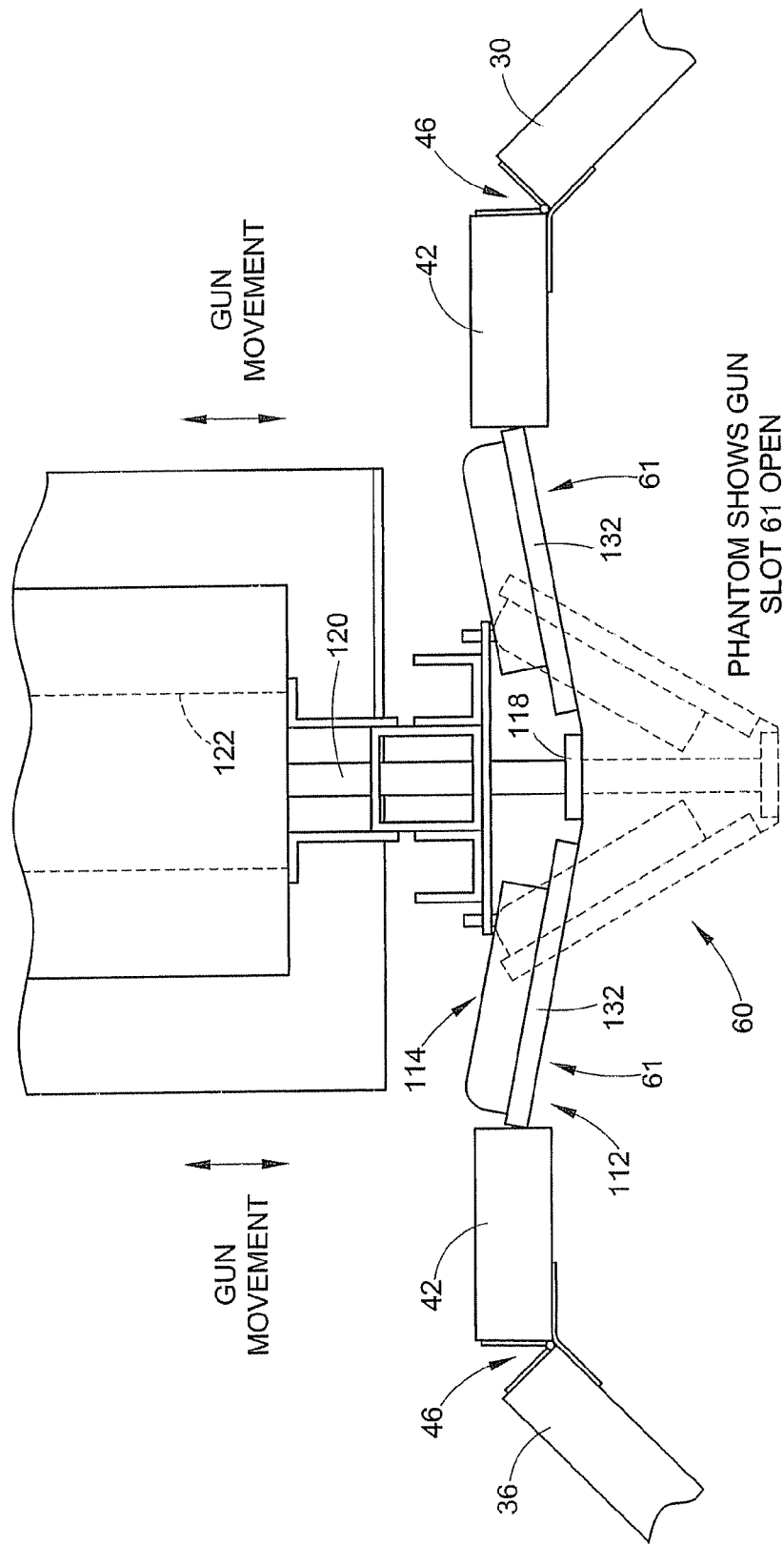
FIG. 7 is a detailed plan illustration of a gun slot cover in accordance with the invention.

FIGS. 7, 8 and 9 illustrate an embodiment of the gun slot cover mechanism 60. The gun slot cover mechanism 60 is used to open and close the gun slots 61. When the gun slots are open, the spray guns can be moved into and out of the spray booth. When the guns have been retracted for a cleaning and/or color change operation, the gun slot cover 60 is positioned so as to prevent powder from escaping through the gun slots. Due to the vertical length of the gun slots, a plurality of covers may be used as required.

The gun slot cover mechanism 60 includes a flexible cover member 112 that is mounted on a frame 114 using a ball and track arrangement 116. A central portion 118 of the cover member is attached to one end of a piston 120 that may be translated, for example, by a pneumatic cylinder 122. A plate 124 supports two ball arms 126 which carry a guide ball 128 thereon. The guide ball 128 slides within a channel 130 attached to the cover member 112. In order to open the gun slots, the piston 120 is pushed outward so as to displace the central portion 118 into the booth interior. The cover member 112 includes two side portions 132 that bend inward as the balls 128 slide along the positionally fixed channels 130. This position is shown in phantom in FIG. 7. When the piston is retracted, the cover member 112 returns to the position illustrated in FIG. 7, which closes the gun slots and forms a smooth sealed gun slot panel 42. Due to their length, as shown in FIG. 8, more than one drive mechanism may be used for each cover.

Figure 10:
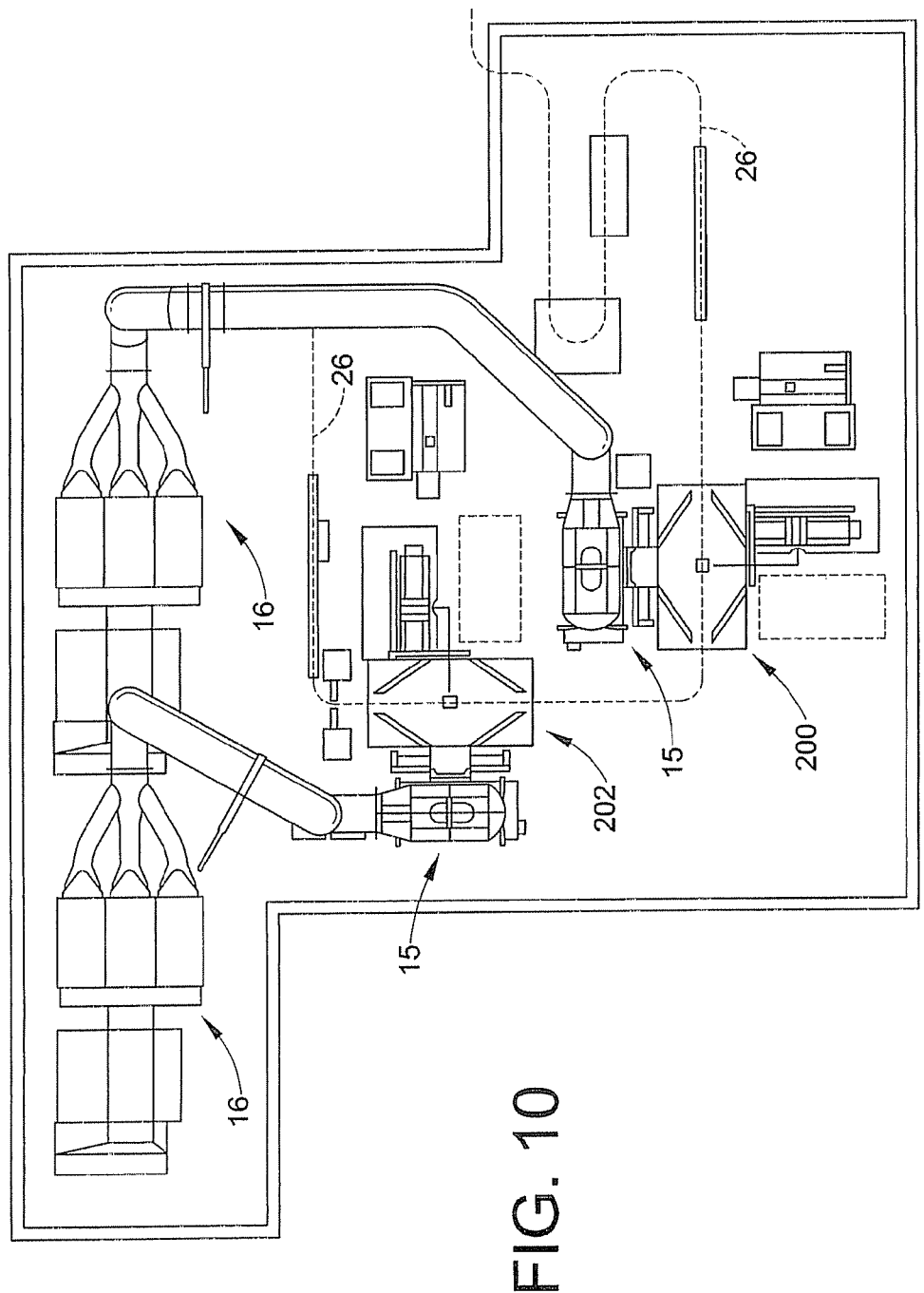
FIG. 10 is a plan layout of a two booth material application system.

With reference to FIG. 10, because the spray guns are positioned on only one side of the spray booth, it may be necessary to double spray the parts. FIG. 10 illustrates an exemplary layout for a material application system that uses two spray booths 200 and 202. The conveyor 26 transports parts through both booths. Note that in this example there are two after filter/blower systems 16, one for each cyclone system 15. As an alternative embodiment, a motor or other suitable drive mechanism may be provided with the conveyor system so as to rotate the parts during a coating operation. This would allow parts to be fully coated within a single booth. Parts may also be manually repositioned for complete coating.

Figure 11:
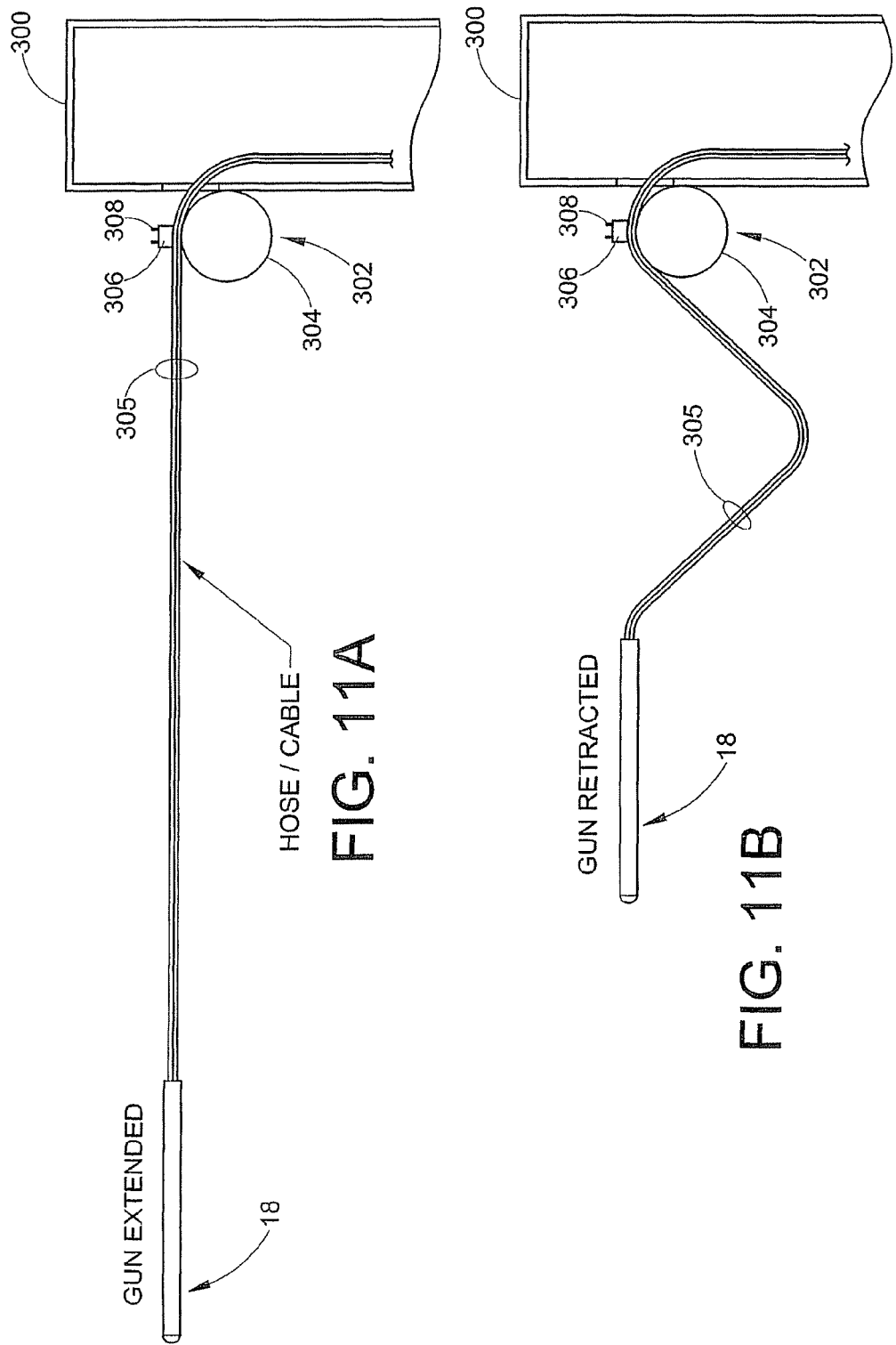
FIGS. 11A and 11B illustrate a hose and cable strain relief mechanism with a gun illustrated in an extended and retracted position respectively.

With reference to FIGS. 1, 11A and 11B, the spray guns 18 typically include one or more hoses and cables 305, including, for example, material feed hoses, air hoses and in the case of electrostatic guns, electrical cables. The material feed hose extends from the gun all the way to the feed center 21. The electrical cables may have to run a substantial distance to an electrical control console (not shown) and the air hoses will typically run a length to a supply manifold or other compressed air source. Particularly in the case of powder feed hoses, for the guns located above normal human height, the hose runs can be quite lengthy. This is especially the case for guns near the top of a twenty-seven foot booth. These hose lengths can be quite heavy and represent a significant load for the gun movers and oscillators.

In accordance with an aspect of the invention, a strain relief arrangement may be provided. This concept contemplates a mechanism that limits the load carried by the gun mover and oscillator while at the same time allowing full range of gun movement during a powder coating operation.

Positioned behind the guns 18 are one or more hose cabinets 300 that extend vertically about to the top of the spray booth 12. Mounted on the cabinets 300 are a plurality of strain relief devices 302. In the exemplary embodiment, there is a single strain relief device 302 for each spray gun, however, one alternative would be to make the strain relief devices of an appropriate size that each could accommodate more than one gun.

Each strain relief device 302 includes a support cylinder 304 and a hose clamp bar 306. A hose and, when used, electrical cables and air hose extend from the associated spray gun, are provided a predetermined slack length between the gun 18 and the cylinder 304 so that the gun mover and oscillator can freely move the guns as desired. The hoses/cables are positioned over the top of the cylinder 304 and then the clamp bar 306 is secured by any convenient means such as bolts 308. The clamping action isolates the hoses and cable weight from the gun and gun mover except for the portion that extends from the gun 18 to the clamp bar 306. In this manner, a fixed predetermined load can be maintained on the gun mover independent of the overall length of the hoses and cables. This also reduces force applied to the back end of the gun and stress on the hoses and cables.

The hoses and cables run from the relief device 302 into the hose cabinet 300 and down to the floor area for further routing as needed. The cylinder 302 should be of sufficient diameter to prevent the hoses from collapsing under their own weight. Note that multiple cabinets may be used as needed depending on the number and size of hoses and cables being routed.

Figure 12:
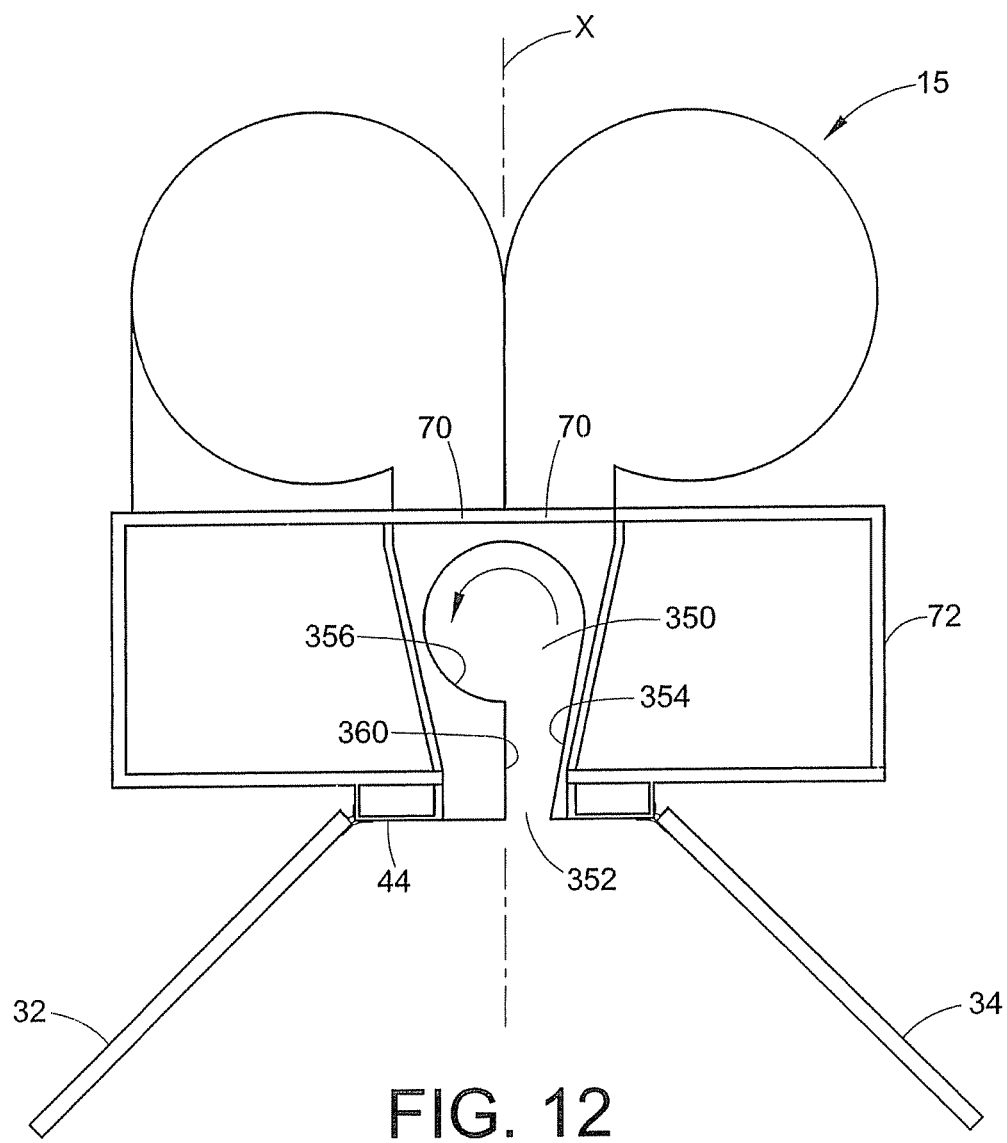
FIG. 12 illustrates an alternative geometry for a recovery duct.

FIG. 12 is a simplified schematic of another feature of the invention. We have found that in some cases, eddy currents and other flow effects can cause entrapment areas or pockets within the recovery duct interior plenum 74. In an alternative embodiment, the interior plenum 350, which it will be recalled is the duct through which powder entrained exhaust air enters the cyclone 15 via the recovery slot 62 and cyclone inlet 70, is provided with an offset or shifted slot opening 352, meaning that the slot is not centered on the central axis X of the plenum 350. In addition, the slot 352 opens to a tangential or tapered surface 354 that joins to the main plenum cylinder 356. This geometry produces a swirling, somewhat cyclonic action within the plenum 350 to reduce eddy currents and entrapment areas or "dead spots."

Even with the embodiment of FIG. 12, or with other configurations, there may be surfaces 360 that are not fully cleaned by air flow within the duct work. FIG. 13 illustrates one solution to this possible anomaly. An air blow off manifold 370 is mounted at one end to the ceiling or roof 40 so that it travels with the roof during a cleaning operation. The blow off manifold 370 may be realized, for example, in the form of a hollow composite extrusion 372 and may be provided with one or more air jets, slots or ports 374 that direct pressurized air 376 at the surfaces 360 of concern.

Pressurized air may be supplied to the blow off manifold 370 from one of the accumulators 86 that are carried by the roof 40, or any other suitable source. A pressure regulator 378 and solenoid valve 380 may be used to control flow of air to the manifold 370. The blow off manifold may be on continuously as the roof 40 travels down and up the booth 12 during a cleaning operation, or may be pulsed.

Figure 14A:
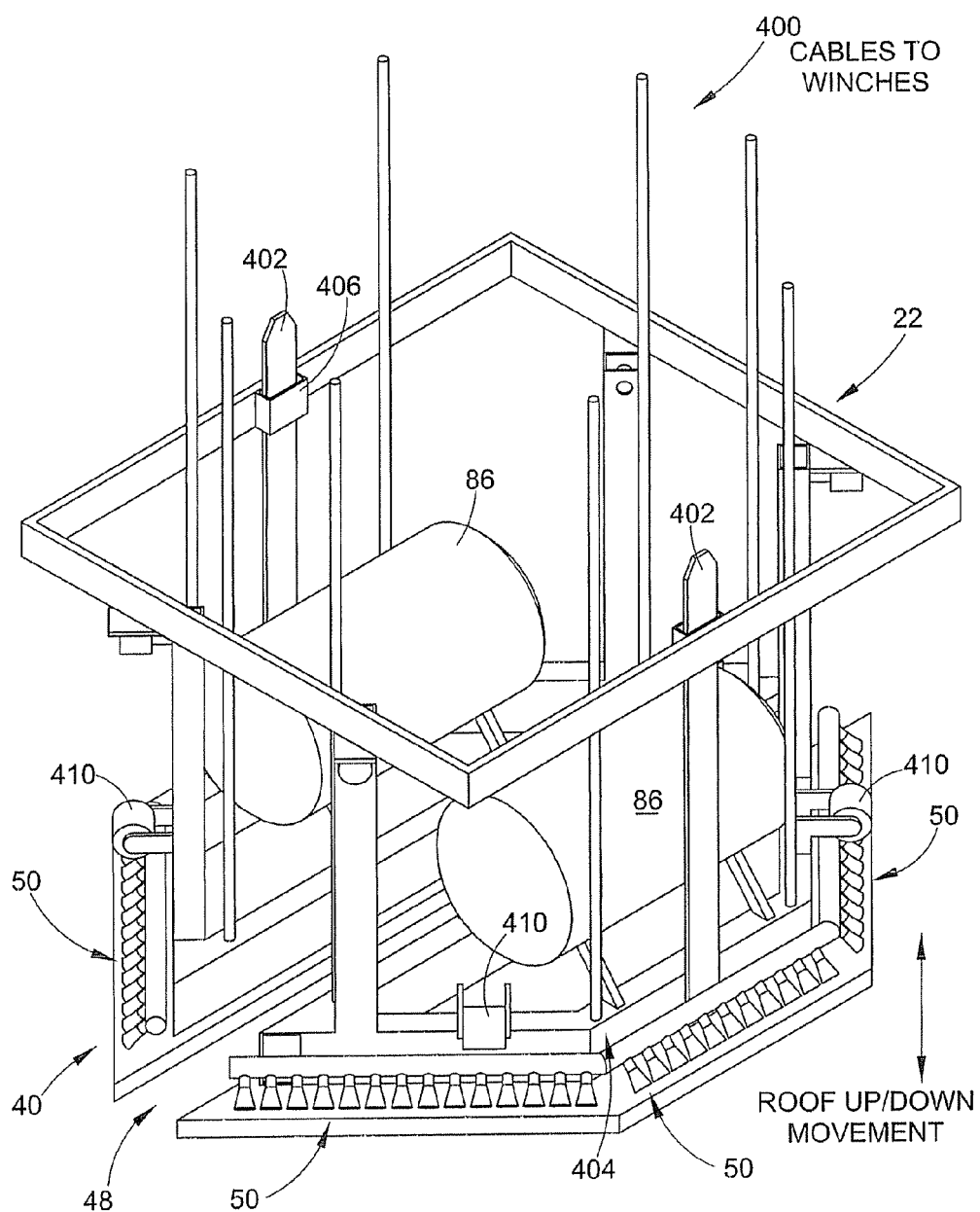
FIGS. 14A and 14B illustrate additional detail of a roof structure for the booth illustrated in FIG. 1 with the roof fully raised and near fully raised respectively.
Figure 14B:
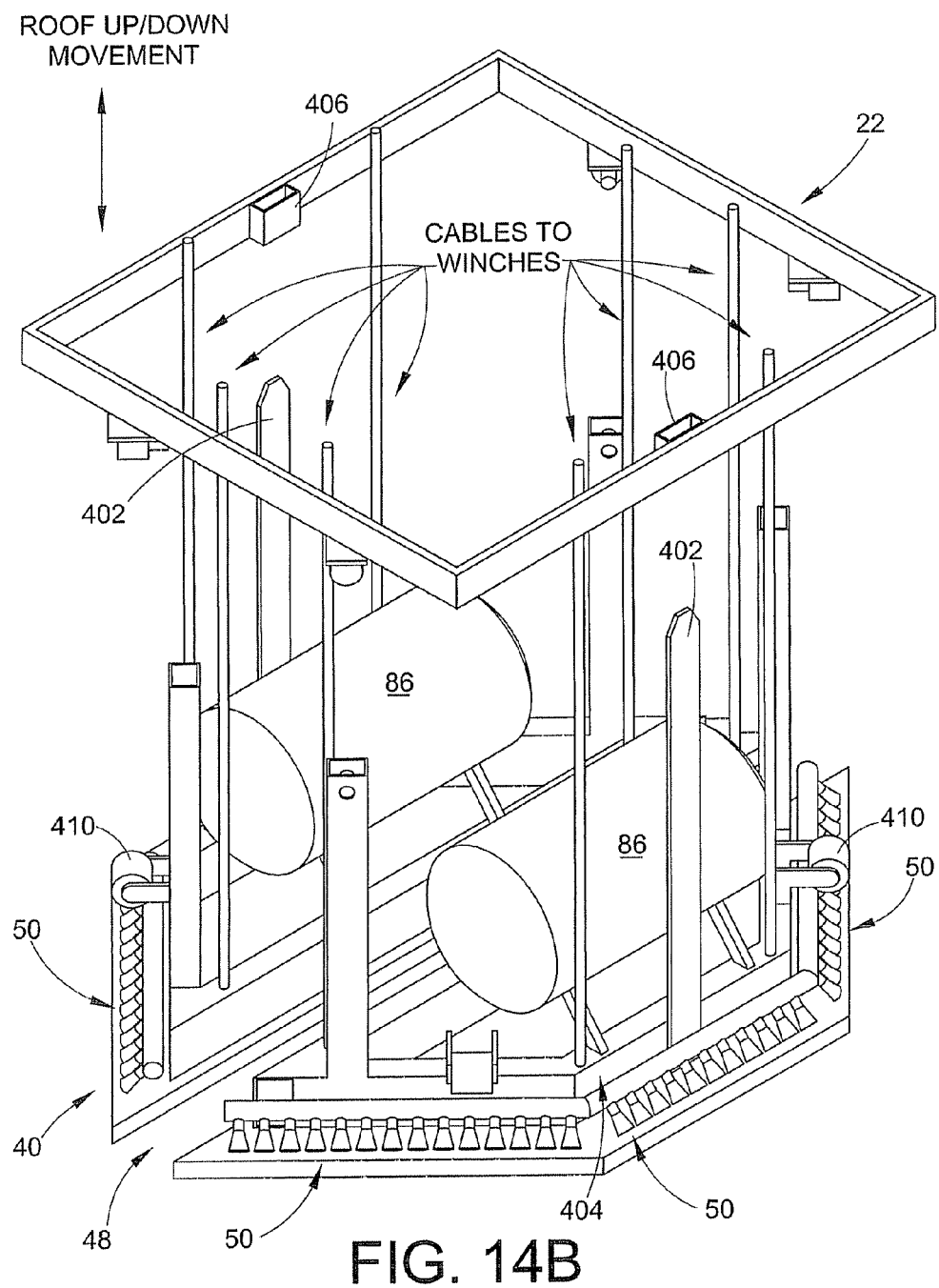

FIGS. 14A and 14B illustrate some additional features that may be used with the roof 40 structure. In some cases when the roof 40 is fully raised, such as during a spraying operation, it may be desired to pulse the nozzles 50 before the conveyor slot cover 52 is closed. In order to maintain stability of the roof 40 that is primarily supported on the cables 400, stabilizers 402 are provided that extend generally vertically from the roof frame 404. These stabilizers 402 may be in the form of stanchions, bars or other suitably strong and rigid members that are slideably received in a stabilizer channel 406 when the roof 40 is raised. The stabilizer channels 406 are rigidly mounted to the overall framework 22 and thus hold the roof 40 stable even against the impulse forces of the nozzles 50.

The roof 40 structure also carries rollers 410. These rollers 410 bridge the narrow gap between the roof 40 and the interior surfaces of the booth doors as the roof 40 is raised and lowered, thereby stabilizing the roof 40, keeping it centered and preventing extreme movement during nozzle 50 pulses. The closed cover 52 (FIG. 3) also helps stabilize the roof 40 during cleaning operation. The rollers 410 may be provided with brushes (not shown) to prevent powder from adhering to the rollers. Since the rollers 410 are positioned above the nozzles 50, the surfaces they contact are clean so that powder is not pressed against the wall surfaces.

It is intended that invention not be limited to the particular embodiment disclosed as the best mode contemplated for carrying out this invention, but that the invention will include all embodiments falling within the scope of the appended claims.

The invention claimed is:

1. A powder spray booth, comprising:
a vertical wall with a vertically extending slot therein, a roof that raises and lowers within said powder spray booth interior during a cleaning operation, a booth floor, a vertical duct that communicates with said vertically extending slot and with an inlet to a cyclone, and a member that travels within said vertical duct with said roof for a portion of the travel of said roof.

2. The powder spray booth of claim 1 wherein said member blocks said cyclone inlet at a predetermined vertical position of the roof.

3. The powder spray booth of claim 1 comprising an opening for extracting powder from said powder spray booth interior other than through said vertically extending slot.

4. The powder spray booth of claim 3 wherein said member blocks said cyclone inlet at a predetermined vertical position of said roof, and powder is extracted from said powder spray booth interior through said vertically extending slot when said member is not blocking said cyclone inlet, and powder is extracted from said powder spray booth interior through said opening when said member blocks said cyclone inlet.

5. The powder spray booth of claim 4 wherein said opening is provided in said booth floor.

6. The powder spray booth of claim 5 wherein a slide cover is used to selectively open and close said opening in said booth floor.

7. The powder spray booth of claim 6 wherein said slide cover is moved from a closed position to an open position when said member blocks said cyclone inlet.

8. The powder spray booth of claim 4 wherein said opening comprises a second slot, said second slot being provided at a lower end of said vertical wall and said booth floor.

9. The powder spray booth of claim 4 wherein said vertical wall forms part of said vertical duct, said vertical duct having a first portion that communicates with said cyclone inlet and said vertically extending slot, said vertical duct having a second portion that communicates with a recovery duct and said opening.

10. The powder spray booth of claim 1 wherein said vertical wall forms part of said vertical duct, said vertical duct having a first portion that communicates with said cyclone inlet and said vertically extending slot, said vertical duct having a second portion that communicates with a recovery duct and said opening.

11. The powder spray booth of claim 10 wherein said member blocks said cyclone inlet at a predetermined vertical position of said roof, and powder is extracted from said powder spray booth interior through said vertically extending slot when said member is not blocking said cyclone inlet, and powder is extracted from said powder spray booth interior through said opening when said member blocks said cyclone inlet.

12. The powder spray booth of claim 11 wherein said opening is provided in said booth floor.

13. The powder spray booth of claim 12 wherein a slide cover is used to selectively open and close said opening in said booth floor.

14. The powder spray booth of claim 11 wherein said opening comprises a second slot, said second slot being provided at a lower end of said vertical wall and said booth floor.

15. The powder spray booth of claim 14 comprising a door that is opened to said recovery duct when said member blocks said cyclone inlet.

16. The powder spray booth of claim 1 wherein said vertically extending slot tapers from a wider portion at either end thereof to a narrower portion near said cyclone inlet.

17. The powder spray booth of claim 1 comprising an accumulator supported by said roof and that is carried by said roof as the roof is raised and lowered.

18. The powder spray booth of claim 17 wherein said roof comprises air nozzles that receive compressed air from said accumulator to blow powder from interior surfaces of the spray booth during a cleaning operation.

19. The powder spray booth of claim 18 wherein said air nozzles received pulsed pressurized air during a cleaning operation.

20. The powder spray booth of claim 17 wherein said accumulator is replenished while said roof is moving during a cleaning operation.

21. The powder spray booth of claim 20 wherein said roof has a perimeter that is sized to provide a gap with interior surfaces of the powder spray booth, with air flow being pulled through said gap and into said cyclone inlet to assist removing powder from said interior surfaces.

22. The powder spray booth of claim 1 wherein said member comprises a bulkhead that travels within said vertical duct.

23. The powder spray booth of claim 22 wherein said bulkhead blocks said cyclone inlet at a predetermined vertical position of said roof.

24. The powder spray booth of claim 23 comprising an opening for extracting powder from said spray booth interior other than through said vertically extending slot.

25. The powder spray booth of claim 24 wherein said bulkhead blocks said cyclone inlet at a predetermined vertical position of said roof, and powder is extracted from said powder spray booth interior through said vertically extending slot when said bulkhead is not blocking said cyclone inlet, and powder is extracted from said powder spray booth interior through said opening when said bulkhead blocks said cyclone inlet.

26. The powder spray booth of claim 25 wherein said opening is provided in said booth floor.

* * * * *